(12) United States Patent
Vezina

(10) Patent No.: US 9,038,758 B2
(45) Date of Patent: May 26, 2015

(54) ICE SCRATCHER FOR A SNOWMOBILE

(71) Applicant: BOMBARDIER RECREATIONAL PRODUCTS INC., Valcourt (CA)

(72) Inventor: Sebastien Vezina, Sherbrooke, CA (US)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 14/354,806

(22) PCT Filed: Oct. 31, 2012

(86) PCT No.: PCT/US2012/062668
§ 371 (c)(1),
(2) Date: Apr. 28, 2014

(87) PCT Pub. No.: WO2013/066925
PCT Pub. Date: May 10, 2013

(65) Prior Publication Data
US 2014/0299399 A1    Oct. 9, 2014

Related U.S. Application Data

(60) Provisional application No. 61/553,623, filed on Oct. 31, 2011.

(51) Int. Cl.
*B60K 11/02* (2006.01)
*B62B 17/02* (2006.01)
*B62D 55/092* (2006.01)
*F01P 9/00* (2006.01)
*E01H 4/00* (2006.01)
*E01H 5/12* (2006.01)
*B62M 27/02* (2006.01)

(52) U.S. Cl.
CPC . *B60K 11/02* (2013.01); *E01H 4/00* (2013.01); *E01H 5/12* (2013.01); *B62M 2027/023* (2013.01); *B60Y 2200/252* (2013.01); *B62B 17/02* (2013.01); *B62D 55/092* (2013.01); *F01P 9/00* (2013.01); *B62M 2027/025* (2013.01); *B62M 27/02* (2013.01); *Y10S 280/90* (2013.01)

(58) Field of Classification Search
CPC ............... B62M 27/00; B62M 27/02; B62M 2027/023; B62M 2027/025; B62M 2027/027; B60K 11/02; E01H 4/00; E01H 4/02; E01H 5/12; B62D 55/092
USPC ............... 180/182, 186, 190; 280/809, 900; 37/219; 305/117, 127
See application file for complete search history.

(56) References Cited

U.S. PATENT DOCUMENTS 3,252,524 A      5/1966   Van Der Lely
4,036,320 A *    7/1977   Rabehl ........................ 180/9.1
(Continued)

OTHER PUBLICATIONS

International Search Report of PCT/US2012/062668, Feb. 25, 2013, Lee W. Young.

*Primary Examiner* — Anne Marie Boehler
(74) *Attorney, Agent, or Firm* — BCF LLP

(57) ABSTRACT

An ice scratcher for attachment to a snowmobile has a first ice scratcher end, a second ice scratcher end opposite the first ice scratcher end, a first coil spring having a first spring axis disposed at or near the first ice scratcher end, a first elongated member having a first end connected to the first coil spring, a second coil spring connected to a second end of the first elongated member, the second coil spring having a second spring axis, and a second elongated member having a first end connected to the second coil spring and a second end at or near the second ice scratcher end. Alternative embodiments of the ice scratcher are disclosed. A snowmobile having the ice scratcher is also disclosed.

12 Claims, 17 Drawing Sheets

(56) References Cited

U.S. PATENT DOCUMENTS

| | | |
|---|---|---|
| 4,076,089 A | 2/1978 | Sanders |
| 4,679,959 A | 7/1987 | Cavallaro |
| 5,277,266 A | 1/1994 | Robinson |
| 6,026,600 A | 2/2000 | Lela |
| 7,527,116 B2 | 5/2009 | Aoshima |
| 7,533,749 B1 | 5/2009 | Sampson |
| 7,918,298 B2 | 4/2011 | Cook |
| 2008/0290728 A1 | 11/2008 | Cook |

\* cited by examiner

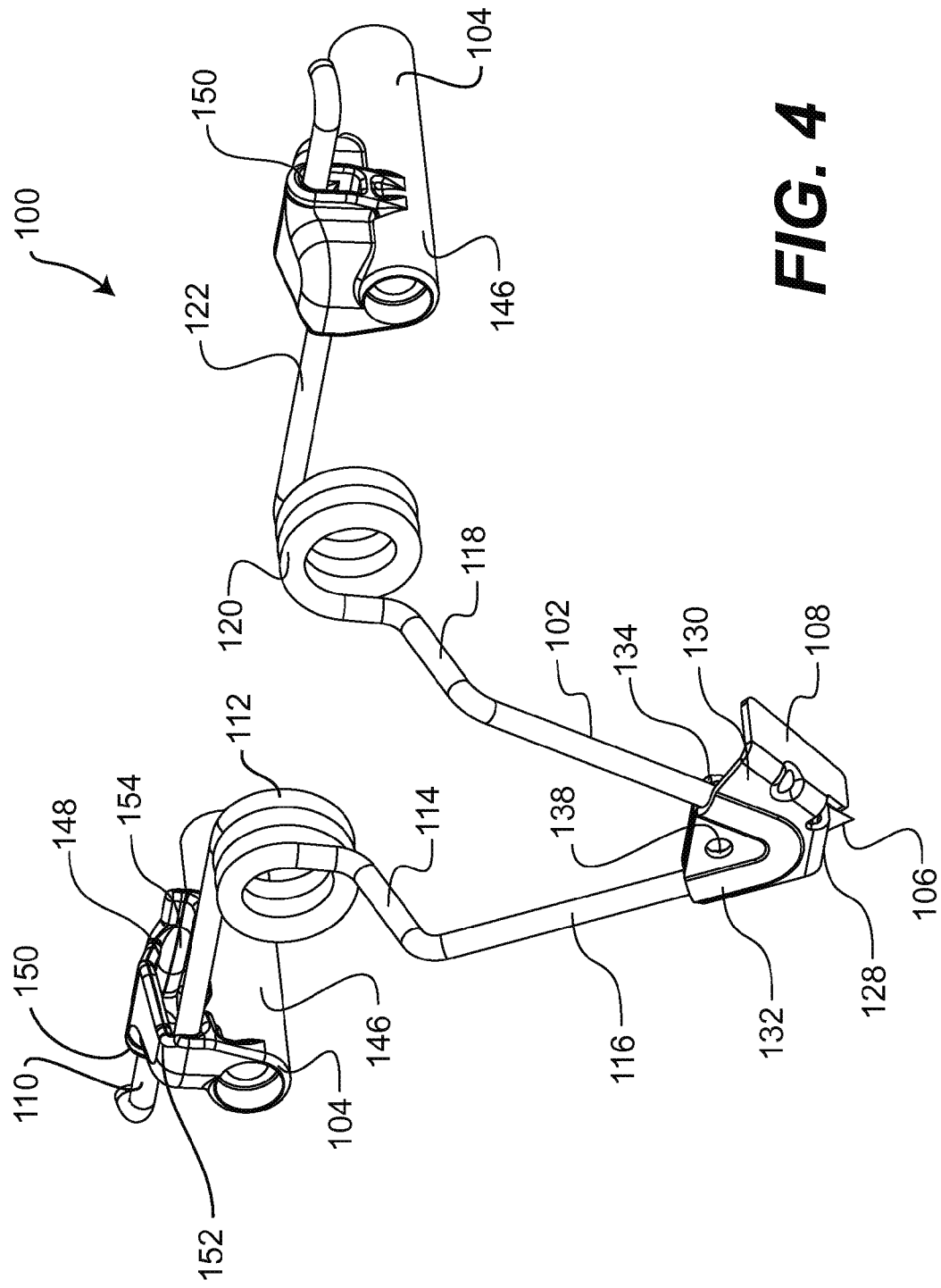

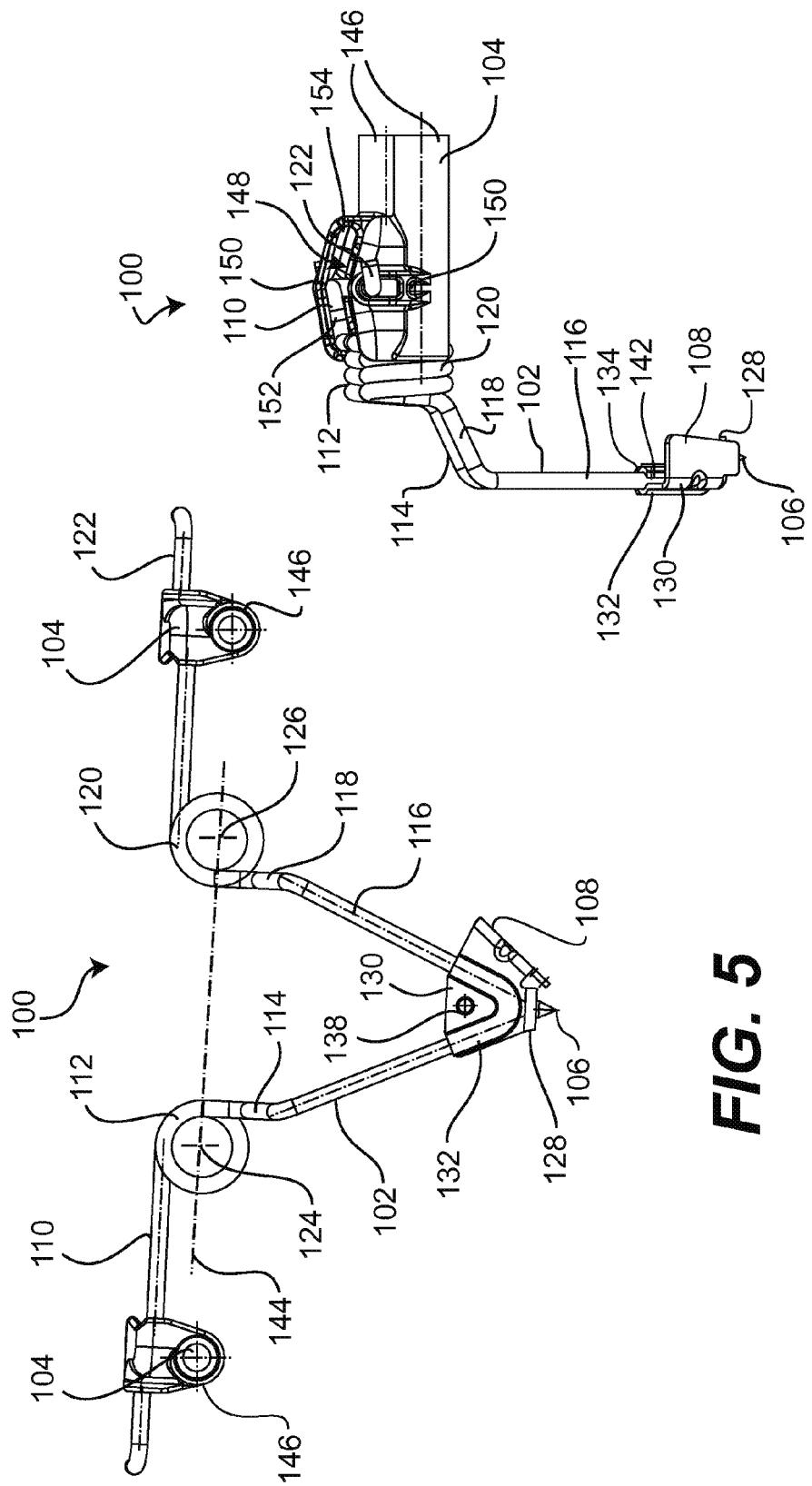

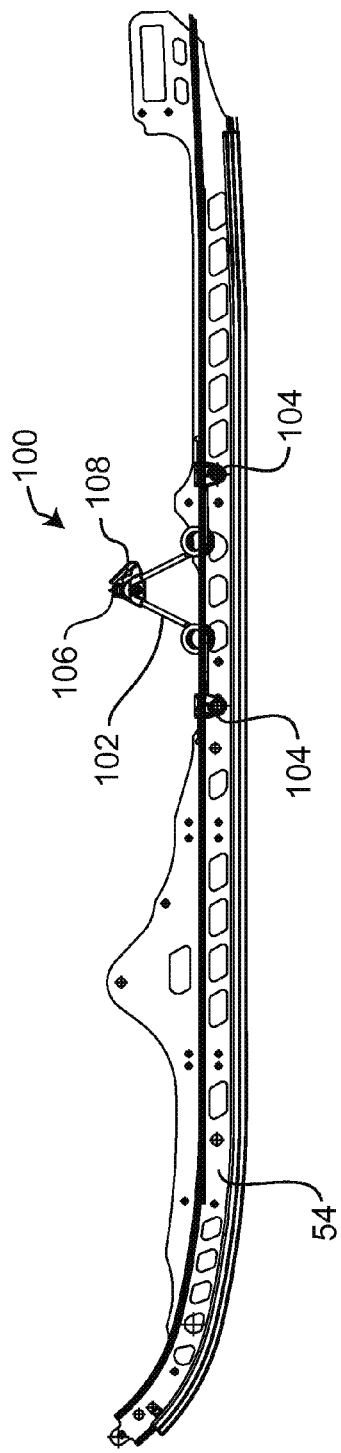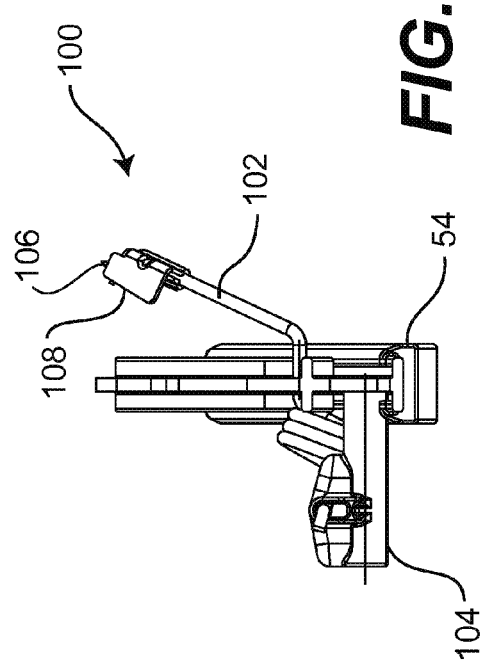

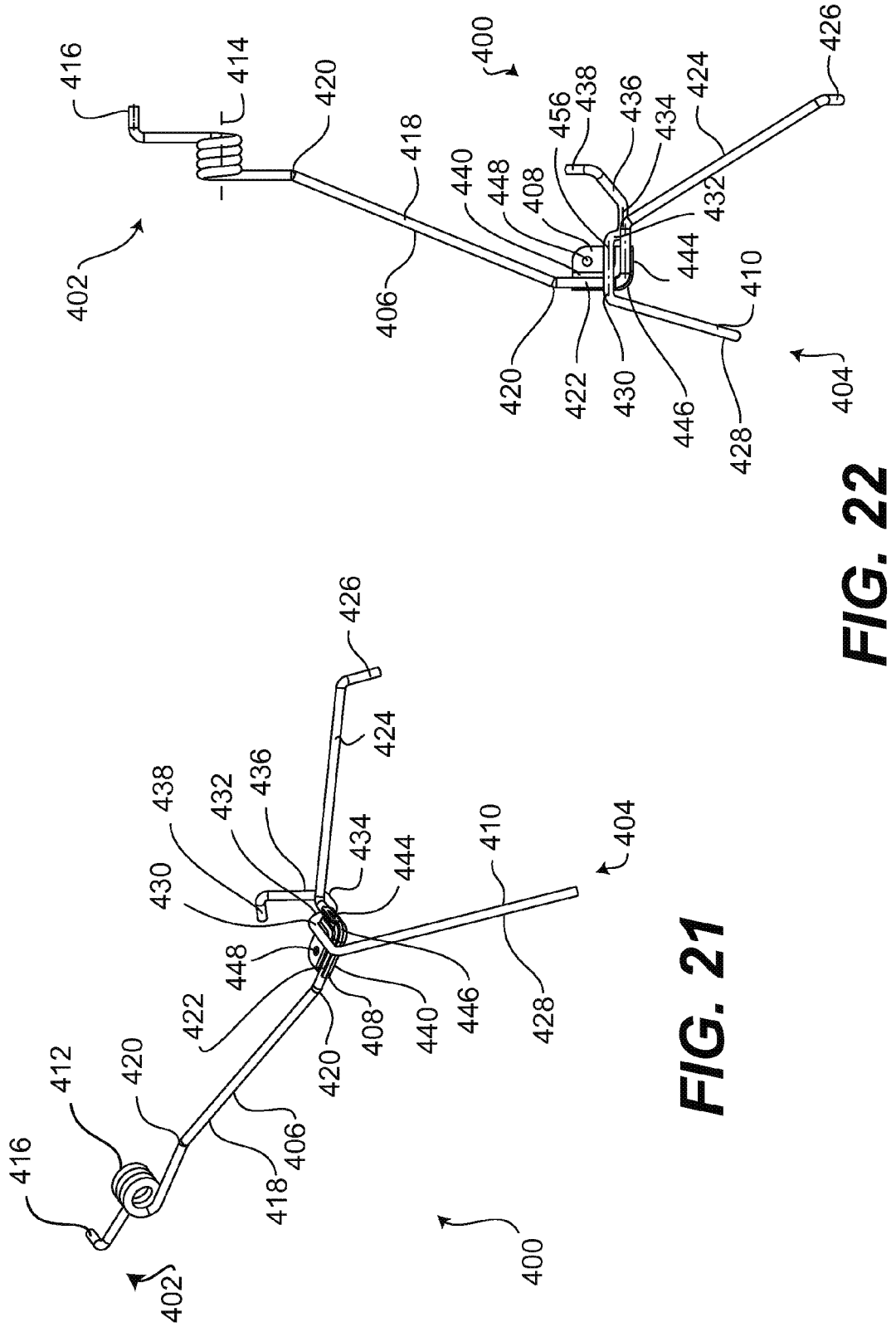

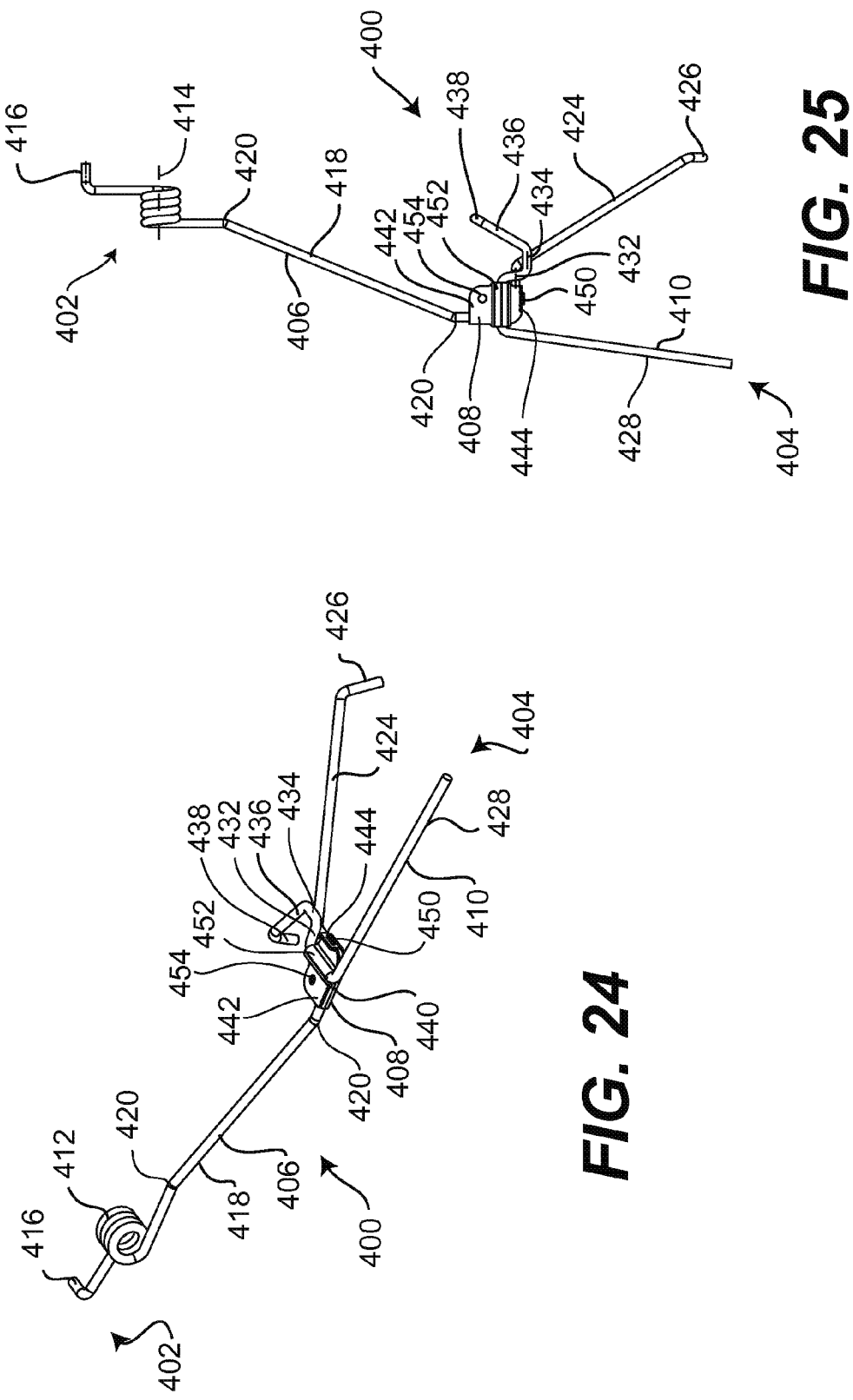

ICE SCRATCHER FOR A SNOWMOBILE

CROSS-REFERENCE

The present application claims priority to United States Provisional Patent Application No. 61/553,623, filed Oct. 31, 2011, the entirety of which is incorporated herein by reference.

TECHNICAL FIELD

The present invention relates to ice scratchers for snowmobiles, and to snowmobiles incorporating ice scratchers.

BACKGROUND

During operation, the track and slide rails of a snowmobile are cooled and lubricated by sprays of loose snow that are generated during the normal operation of the snowmobile on loose snow.

In snowmobiles having liquid cooled engines, heat exchangers are often provided under the tunnel to take advantage of these sprays of loose snow. The sprayed snow makes contact with the heat exchanger and absorbs the heat from the coolant flowing in the heat exchangers.

However, when a snowmobile operates on hard packed snow or an icy surface, smaller sprays are generated or no spray at all. As a result, the track and slide rails are not cooled as efficiently. Also, the friction between the track and slide rails increases since the amount of lubricant (i.e. snow) therebetween is reduced, which contributes to further heating of the track and slide rails and can lead to premature wear of these components. Also, in the case of snowmobiles with liquid cooled engines with heat exchangers provided under the tunnel, the coolant flowing in the heat exchangers is cooled less efficiently since the heat transfer then relies mostly on heat transfer with the cold air.

To address this problem, devices have been developed to scratch a surface of the ice or snow to generate a spray of ice or snow when the snowmobile operates on such surfaces in order to provide the desired cooling and lubrication. These devices are known by many different names such as snow tillers, spray generating devices, and snow lubrication devices. For simplicity, these will be referred to as ice scratchers herein.

U.S. Pat. No. 5,277,266, issued Jan. 22, 1994, the entirety of which is incorporated herein by reference describes one such device. The device consists of a rod forming a coil spring at one end thereof. The device is mounted on the snowmobile such that the end opposite the one where the coil spring is formed is in contact with the surface on which the snowmobile operates. The coil spring generates a downward force on the end contacting the surface, such that the end generates a spray of snow or ice as the snowmobile moves forward. The coil spring also allows the end contacting the surface to follow the surface which may not always be even.

Although the above device effectively generates a spray of snow or ice when the snowmobile moves forward, moving the snowmobile in the reverse direction with the end of the rod in contact with the surface on which the snowmobile operates can cause the rod to bend or even break.

Therefore, there is a need for an ice scratcher that can be used with the snowmobile moving forwardly or rearwardly.

SUMMARY

One object of the present is to ameliorate at least some of the inconveniences of the prior art.

In one aspect, an ice scratcher for attachment to a snowmobile has a coil spring having a spring axis, a first member connected to the coil spring, a second member connected to the first member, the first member being connected between the coil spring and the second member, a third member connected to the second member, the second member being connected between the first member and the third member, a connector connected to the second member, an L-shaped member having a first leg and a second leg, the second leg being pivotally connected to the connector about a pivot axis, the first leg extending on a first side of the connector, a fourth member connected to the second leg and being disposed on a second side of the connector, the L-shaped member and the fourth member being pivotable together about the pivot axis, the third member limiting rotation of the L-shaped member and the fourth member about the pivot axis by abutting the fourth member.

In a further aspect, the spring and pivot axes are generally parallel to each other.

In an additional aspect, when the ice scratcher is attached in an operative position to a snowmobile at rest, a free end of the first leg of the L-shaped member is disposed rearwardly of the pivot axis, and the spring axis is disposed forwardly of the pivot axis.

In a further aspect, the coil spring and the first, second and third members are integrally formed, and the L-shaped member and the fourth member are integrally formed.

In an additional aspect, the second member is an L-shaped member; and the connector has an L-shaped channel receiving the second member therein.

In a further aspect, a fifth member is connected to the third member and extending rearwardly therefrom.

In another aspect, a snowmobile has a frame including a tunnel, at least one ski operatively connected to the frame, a seat disposed on the tunnel, an engine connected to the frame, an endless track disposed at least in part under the tunnel and operatively connected to the engine, a suspension assembly operatively connected to the track, and at least one ice scratcher according to one or more of the above aspects operatively connected to one of the frame and the suspension assembly. The at least one ice scratcher has an operative position where a free end of the first leg of the L-shaped member of the at least one ice scratcher is in contact with a surface on which the snowmobile operates at a position laterally outward of the endless track.

In a further aspect, the at least one ice scratcher is selectively movable to a stowed position where the free end of the first leg of the L-shaped member of the at least one ice scratcher is spaced from the surface on which the snowmobile operates.

In one aspect, an ice scratcher for attachment to a snowmobile has a first ice scratcher end, a second ice scratcher end opposite the first ice scratcher end, a first coil spring having a first spring axis disposed at or near the first ice scratcher end, a first elongated member having a first end connected to the first coil spring, a second coil spring connected to a second end of the first elongated member, the second coil spring having a second spring axis, and a second elongated member having a first end connected to the second coil spring and a second end at or near the second ice scratcher end.

In an additional aspect, the first and second elongated members form a V-shape.

In a further aspect, in a direction parallel to the first spring axis, the first elongated member is disposed between the first and second coil springs, and the second coil spring is disposed between the first and second elongated members.

In an additional aspect, the first and second spring axes are generally parallel to each other.

In a further aspect, when the ice scratcher is attached in an operative position to a snowmobile at rest, the second end of the second elongated member is disposed forwardly of the first spring axis, and the first spring axis is disposed forwardly of the second spring axis.

In an additional aspect, when the ice scratcher is attached in an operative position to a snowmobile at rest, the first elongated member extends downwardly and rearwardly from the first coil spring to the second coil spring and the second elongated member extends downwardly and forwardly from the second coil spring toward the second ice scratcher end.

In a further aspect, the second elongated member is bent at a bend point. The second elongated member has a first portion between the first end of the second elongated member and the bend point and a second portion between the bend point and the second end of the second elongated member. When the first and second springs are unstressed, a first angle between the first portion and the first elongated member is greater than a second angle between the second portion and the first elongated member.

In an additional aspect, the first elongated member, the second elongated member, the first coil spring and the second coil spring are integrally formed.

In another aspect, a snowmobile has a frame including a tunnel, at least one ski operatively connected to the frame, a seat disposed on the tunnel, an engine connected to the frame, an endless track disposed at least in part under the tunnel and operatively connected to the engine, a suspension assembly operatively connected to the track, and at least one ice scratcher according to one or more of the above aspects operatively connected to one of the frame and the suspension assembly. The at least one ice scratcher has an operative position where the second ice scratcher end of the at least one ice scratcher is in contact with a surface on which the snowmobile operates at a position laterally outward of the endless track.

In a further aspect, at least one bracket is connected to the tunnel. The first ice scratcher end of the at least one ice scratcher is connected to the at least one bracket.

In an additional aspect, the at least one ice scratcher is selectively movable to a stowed position where the second ice scratcher end of the at least one ice scratcher is spaced from the surface on which the snowmobile operates.

In a further aspect, the at least one ice scratcher includes a left ice scratcher operatively connected to a left side of the one of the frame and the suspension assembly and a right ice scratcher operatively connected to a right side of the one of the frame and the suspension assembly.

In another aspect, an ice scratcher for attachment to a snowmobile has a first ice scratcher end, a second ice scratcher end opposite the first ice scratcher end, a coil spring having a spring axis disposed at or near the first ice scratcher end, a first member having a first end connected to the coil spring, and a second member pivotally connected to the first member about a pivot axis, the second member having an end at or near the second ice scratcher end.

In an additional aspect, the second member is biased toward an operative position.

In a further aspect, the coil spring is a first coil spring having a first spring axis. A second coil spring connects the first member to the second member. The second coil spring has a second coil spring axis. The pivot axis is defined by the second coil spring axis.

In an additional aspect, a connector connects the first member to the second member. The second member is pivotally connected to the connector.

In a further aspect, the spring axis and the pivot axis are generally parallel.

In another aspect, a snowmobile has a frame including a tunnel, at least one ski operatively connected to the frame, a seat disposed on the tunnel, an engine connected to the frame, an endless track disposed at least in part under the tunnel and operatively connected to the engine, a suspension assembly operatively connected to the track, and at least one ice scratcher according to one or more of the above aspects operatively connected to one of the frame and the suspension assembly. The at least one ice scratcher has an operative position where the second ice scratcher end of the at least one ice scratcher is in contact with a surface on which the snowmobile operates at a position laterally outward of the endless track.

In an additional aspect, the at least one ice scratcher is selectively movable to a stowed position where the second ice scratcher end of the at least one ice scratcher is spaced from the surface on which the snowmobile operates.

For purposes of this application, terms related to spatial orientation such as forwardly, rearwardly, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle, such as the ice scratcher for example, should be understood as they would be understood when these components or sub-assemblies are mounted to the vehicle.

Embodiments of the present invention each have at least one of the above-mentioned aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 4 is a perspective view taken from a rear, left side of the ice scratcher of FIG. 2 in the operative position;

FIG. 5 is a left side elation view of the ice scratcher of FIG. 4;

FIG. 6 is a rear elevation view of the ice scratcher of FIG. 4;

FIG. 7 is a left side elevation view of the left ice scratcher mounted on the left slide rail of the snowmobile of FIG. 1 with the ice scratcher in a stowed position;

FIG. 8 is a rear elevation view of the ice scratcher and slide rail of FIG. 7;

FIG. 21 is a perspective view, taken from a rear, left side, of the ice scratcher of FIG. 19, with a cover of a connector of the ice scratcher removed;

FIG. 22 is a top plan view of the ice scratcher of FIG. 19, with the cover of the connector removed;

FIG. 24 is a perspective view, taken from a rear, left side, of the ice scratcher of FIG. 19 in the stowed position; and FIG. 25 is a top plan view of the ice scratcher of FIG. 19 in the stowed position.

DETAILED DESCRIPTION

Figure 1:
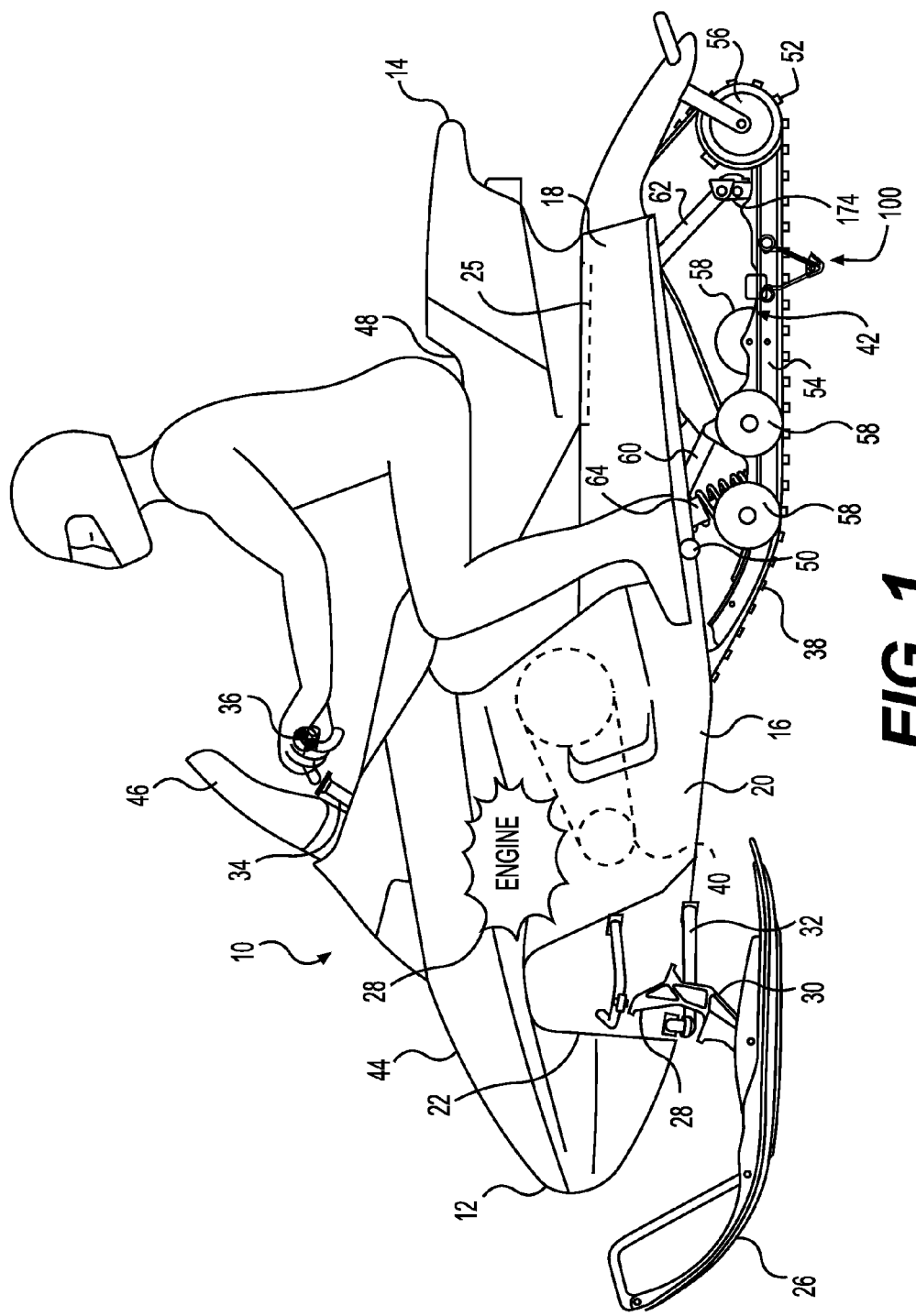
FIG. 1 is a left side elevation view of a snowmobile with a driver thereon in a straddling position with an ice scratcher in an operative position.

Referring to FIG. 1, a snowmobile 10 will be described. Although a snowmobile is presented herein, it is contemplated that aspects of the present invention could be applied to other types of tracked vehicles operating on snow or ice, such as all-terrain vehicles provided with track kits and snow groomers.

The snowmobile 10 includes a front end 12 and a rear end 14, which are defined consistently with the forward travel direction of the vehicle. The snowmobile 10 includes a frame 16. The frame 16 includes a tunnel 18, an engine cradle portion 20 and a front suspension assembly portion 22. An engine 24, which is schematically illustrated, is supported by the engine cradle portion 20. Coolant used to cool the engine 24 is circulated through heat exchangers 25 (schematically shown) to be cooled. The heat exchangers 25 are mounted under the tunnel 18. A ski and steering assembly is provided, in which two skis 26 (only one of which is shown) are positioned at the front end 12 of the snowmobile 10, and are attached to the front suspension assembly portion 22 through a front suspension assembly 28. The front suspension assembly 28 includes ski legs 30 and A-arms 32. It is contemplated that other types of front suspension assemblies could be used. A steering column 34 is attached at its upper end to a steering device, in this case a handlebar 36, which is positioned forward of a rider and behind the engine 24. The steering column 34 is operatively connected to the ski legs 30 and the skis 26, in order to steer the skis 36, and the snowmobile 10, when the handlebar 36 is turned. It is contemplated that the snowmobile 10 could have only one ski 26.

An endless drive track 38 is positioned at the rear end 14 of the snowmobile 10 and is disposed under the tunnel 18. The endless drive track 38 is operatively connected to the engine 24 through a belt transmission system 40 which is schematically illustrated by broken lines. Thus, the endless drive track 38 is driven to run about a rear suspension assembly 42 for propulsion of the snowmobile 10. The rear suspension assembly 42 will be described in greater detail below.

Fairings 44 are provided at the front end 12 of the snowmobile 10. The fairings 44 enclose the engine 24 and the belt transmission system 40, thereby providing an external shell that not only protects the engine 24 and the belt transmission system 40, but also make the snowmobile 10 more aesthetically pleasing. The fairings 44 include a hood and one or more side panels that can be opened to allow access to the engine 24 and the belt transmission system 40 when this is required, for inspection or maintenance of the engine 24 and/or the belt transmission system 40 for example. A windshield 46 is connected to the fairings 44 near the front end 12 of the snowmobile 100. It is contemplated that the windshield 46 could be attached directly to the handlebar 36. The windshield 46 acts as a windscreen to lessen the force of the air on the rider while the snowmobile 10 is moving forward.

A seat 48 is disposed on the tunnel 18. Two footrests 50 (only one of which is shown) are positioned on opposite sides of the tunnel 18 below the seat 48 to accommodate the rider's feet. The footrests 50 are integrally formed with the tunnel 18.

The endless drive track 38 is engaged with and driven by a drive sprocket (not shown) that is journaled by the tunnel 18 and is driven by the engine 24 through the belt transmission system 40. The endless drive track 38 is suspended for movement relative to the frame 16, by the rear suspension assembly 42, as will be described below. The endless drive track 38 has a plurality of lugs 52 extending from an outer surface thereof to provide traction to the track 38.

The rear suspension assembly 42 will now be described. The rear suspension assembly 42 includes a slide frame assembly that includes a pair of spaced apart slide rails 54 that engage the inner side of the endless drive track 38. The slide frame assembly journals a plurality of backup rollers (not shown) and four idler rollers 56 (only one being shown). Further rollers 58 are carried by the tunnel 18, in order to define the path over which the endless drive track 38 travels.

Front suspension arms 60 (only one being shown) are pivotally connected between the tunnel 18 and the slide rails 54. Rear suspension arms 62 (only one being shown) are also pivotally connected between the tunnel 18 and the slide rails 54. A front shock absorber assembly 64 is disposed between the tunnel 18 and the slide frame assembly. The front shock absorber assembly 64 is a damping unit that includes a hydraulic damper and a coil spring for absorbing the impact energy when impact forces are applied to the opposite ends of the damping unit. The coil spring biases the damping unit toward an extended position so that the hydraulic damper is in a position to absorb the impact energies. A rear shock absorber (not shown) is also provided.

The above is only one possible embodiment of a rear suspension assembly that can be provided on the snowmobile 10. It is contemplated that other embodiments could be provided.

As can be seen in FIG. 1, an ice scratcher 100 is connected to the left slide rail 54 of the snowmobile 10. Another ice scratcher 100 is also connected to the right slide rail 54 on the other side of the snowmobile 10. The lower end of the ice scratchers 100 scratch the surface of the ice or the snow on which the snowmobile 10 operates and create sprays of ice or snow. Part of the sprayed ice or snow is deposited on the inner surface of the track 38 and thereby lubricates the interface between the slide rails and the inner surface of the track 28. The sprayed ice or snow also cools the track 28 and elements of the suspension assembly 42. Part of the sprayed ice or snow is also flung by the track 38 onto the heat exchangers 25 to assist in cooling the engine coolant. As should be understood from the above description, although they are called ice scratchers 100, the ice scratchers 100 can be used to scratch both icy and snowy surfaces.

Turning now to FIGS. 2 to 10, the left ice scratcher 100 will be described. Since the right ice scratcher 100 is a mirror image of the left ice scratcher 100, it will not be described herein. It should be noted that in FIGS. 2 and 3 (and also FIG. 1) the ice scratcher 100 is shown as it would appear when uncompressed, such as when the snowmobile 10 is at rest on very soft snow, or with the track 38 lifted above the ground. When the snowmobile 10 operates on ice or hard packed snow, the ice scratcher 100 is compressed and the lower end of the ice scratcher 100 is closer to the slide rail 54 than shown. The ice scratcher 100 is movable between an operative position shown in FIGS. 2 to 6 and a stowed position shown in FIGS. 7 to 10. When in the stowed position, the ice scratcher 100 does not scratch the surface on which the snowmobile operates.

As can be seen in FIGS. 4 to 6, the ice scratcher 100 consists of a bent metal rod 102, a pair of connectors 104, a scratching member 106 and a deflector 108.

The bent rod 102 is bent to form a stepped portion 110 followed by a coil spring 112. From the coil spring 112, the bent rod 102 forms an outwardly extending member 114, followed by a V-shaped member 116, and another outwardly extending member 118. The outwardly extending members 114, 118 locate the V-shaped member 116 laterally outwardly of the slide rail 54 and track 38 when the ice scratcher 100 is in the operative position. From the outwardly extending member 118, the bent rod 100 forms another coil spring 120. From the coil spring 120, the bent rod 102 forms another stepped portion 122. The coil springs 112, 120 are formed such that their spring axes 124, 126 (FIG. 5) respectively are generally parallel to each other. As can be seen, the coil springs 112, 120 are wound in directions opposite from each other. It should be understood that the order in which the various portions formed by the bent rod 102 has been used for ease of explanation and does not necessarily correspond to the order in which the bent rod 102 is bent to form these portions. For example, it is contemplated that the rod 102 could be bent to form the V-shaped member 116 first, followed by the coil springs 112, 120, the stepped portions 110, 122 and finally the outwardly extending members 114, 118. It is contemplated that one, more, or all of the various portions formed by the bent rod 102 above could be separate elements that are then connected to the other elements by welding for example. In other words, the various portions formed by the rod 102 above do not have to be all integrally formed as described.

Figure 9:
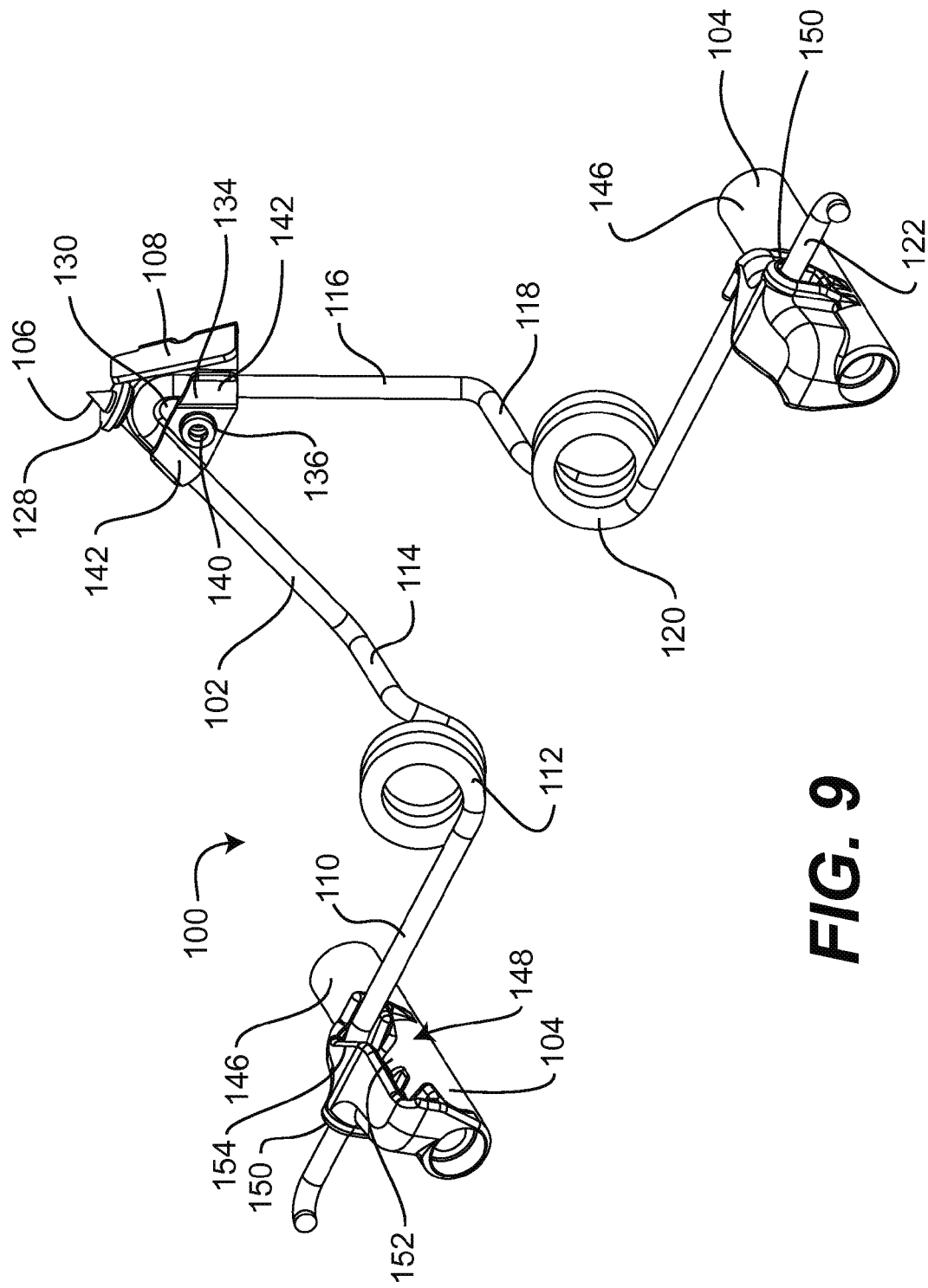
FIG. 9 is a perspective view taken from a rear, left side of the ice scratcher of FIG. 7 in the stowed position.
Figure 10:
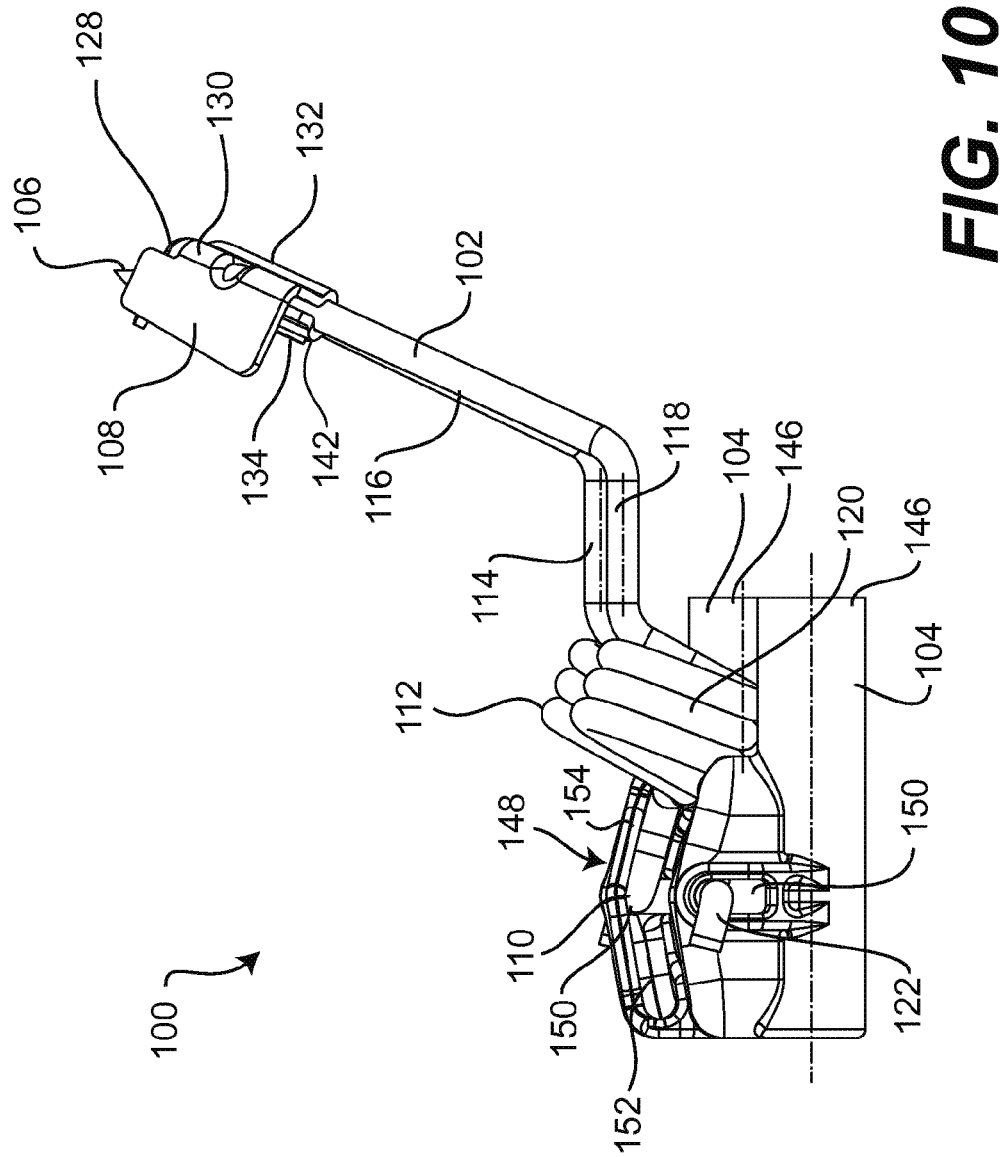
FIG. 10 is a rear elevation view of the ice scratcher of FIG. 9.

The scratching member 106 consists of a short pointed rod. The scratching member is fastened onto a tab 128 (best seen in FIG. 9) of a bracket 130. As such, the scratching member 106 can be replaced when it is worn. The bracket 130 forms a channel 132 that receives an apex portion of the V-shaped member 116 therein. A plate 134 (FIG. 9) is disposed on the other side of the V-shaped member 116 and is fastened to the bracket 130 via a rivet 136 (FIG. 9) inserted in apertures 138, 140 formed in the bracket 130 and plate 134 respectively such that the bracket 130 is connected to the V-shaped member 116. As can be seen in FIG. 9, the plate 134 forms channels 142 to receive portions of the V-shaped member 116. It is contemplated that the bracket 130 and the plate 134 could be connected by a fastener other than a rivet, or could be welded to each other. It is contemplated that the bracket 130 and the plate 134 could be omitted and that the scratching member 106 could be connected directly to the apex of the V-shaped member 116, or that the apex of the V-shaped member 116 could be shaped to form the scratching member 106.

The deflector 108 is integrally formed with the bracket 130. As can be seen in the figures, the deflector 108 is disposed in proximity to the scratching member 106. The deflector 108 is disposed rearwardly of the scratching member 106 and consists of a plate extending generally toward its corresponding slide rail 54 (see FIG. 3), such that the deflector 108 deflects the snow or ice spray formed by the scratching member 106 toward the track 38 and slide rail 54.

As best seen in FIG. 5, the scratching member 106 is disposed between the two coil springs 112, 120. In the present embodiment, the scratching member 106 is centered between the spring axes 124, 126. When the ice scratcher 100 is in the operative position, the scratching member 106 is disposed below a plane 144 passing through the spring axes 124, 126. When the ice scratcher 100 is in the stowed position, the scratching member 106 is disposed above the plane 144. Also, since the scratching member 106 is connected to the apex of the V-shaped member 106, the scratching member 106 is spaced from the coil springs 112, 120 in a direction parallel to the spring axes 124, 126 as can be seen in FIG. 6. As a result, when the ice scratcher 100 is in the operative position, the scratching member 106 is in contact with the surface on which the snowmobile 10 operates at a position laterally outward of the endless track 38.

Figure 2:
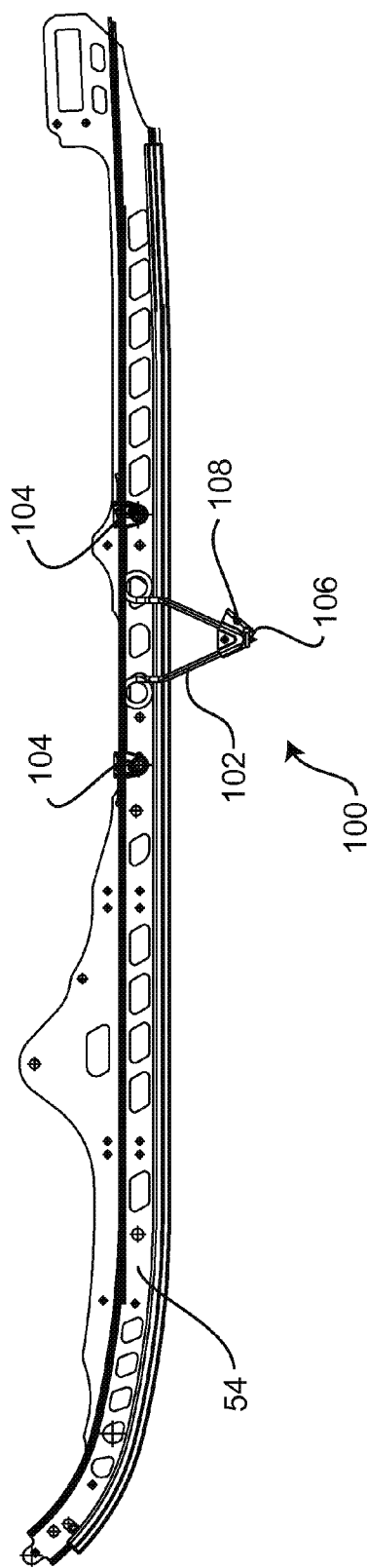
FIG. 2 is a left side elevation view of a left ice scratcher mounted on a left slide rail of the snowmobile of FIG. 1 with the ice scratcher in an operative position.
Figure 3:
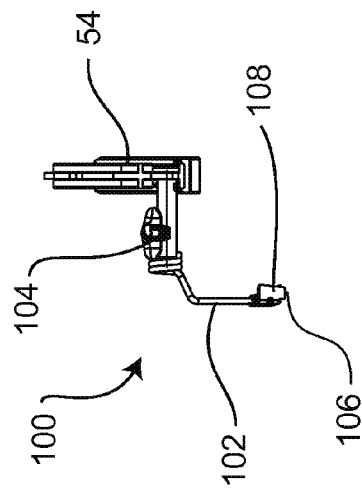
FIG. 3 is a rear elevation view of the ice scratcher and slide rail of FIG. 2.

Each connector 104 includes a cylindrical portion 146 adapted to receive a fastener (not shown) used to connect the ice scratcher 100 to the slide rail 54 at the locations shown in FIGS. 2 and 3. It is contemplated that the ice scratcher 100 could be mounted elsewhere on the slide rail 54, to another portion of the suspension assembly 42 or elsewhere on the snowmobile 10.

Each connector 104 also includes a V-shaped groove 148 having an aperture 150 defined at an apex thereof. The apertures 150 define a pivot axis of the bent rod 102 about which the bent rod 102 is pivoted to move the ice scratcher 100 between its operative and stowed positions. In the present embodiment, the axes of the apertures 150 are coaxial, however it is contemplated that the axes could be offset from each other.

The stepped portions 110, 122 of the bent rod 102 are inserted in their corresponding apertures 150. When in the operative position, as shown in FIGS. 2 to 6, a portion of each stepped portion 110, 122 is received in an outward leg 152 (with respect to the snowmobile 10) of the V-shaped groove 148. As such, the bent rod 102 is prevented from pivoting inside the aperture 150. To move the bent rod 102 to the stowed position, as shown in FIGS. 7 to 10, the V-shaped member 116 is first squeezed such that the portion of each stepped portion 110, 122 that are received in the legs 152 come out of the of the V-shaped groove 148. The bent rod 102 can then be pivoted to the stowed position. When in the stowed position, the portion of each stepped portion 110, 122 is received in an inward leg 154 (with respect to the snowmobile 10) of the V-shaped groove 148. As such, the bent rod 102 is prevented from pivoting inside the aperture 150. To move the bent rod 102 from the stowed position to the operative position a method similar to the one described above for moving the bent rod 102 from the operative position to the stowed position is used, which consists in first squeezing the V-shaped member 116.

When the snowmobile 10 is in operation with the ice scratcher 100 in its operative position, the coil springs 112, 120 bias the scratching member 106 against the surface (ice or snow) on which the snowmobile 10 operates with enough force to scratch the surface and generate a spray of ice or snow. The coil springs 112, 120 also absorb shocks applied to the scratching member 106 caused by uneven terrain or obstacles, such as rocks, that the scratching member 106 can encounter, and this regardless of the direction in which the snowmobile 10 is moving. The coil springs 112, 120 also allow for some lateral movement of the scratching member 106 (i.e. left and right in FIG. 6).

Figure 11:
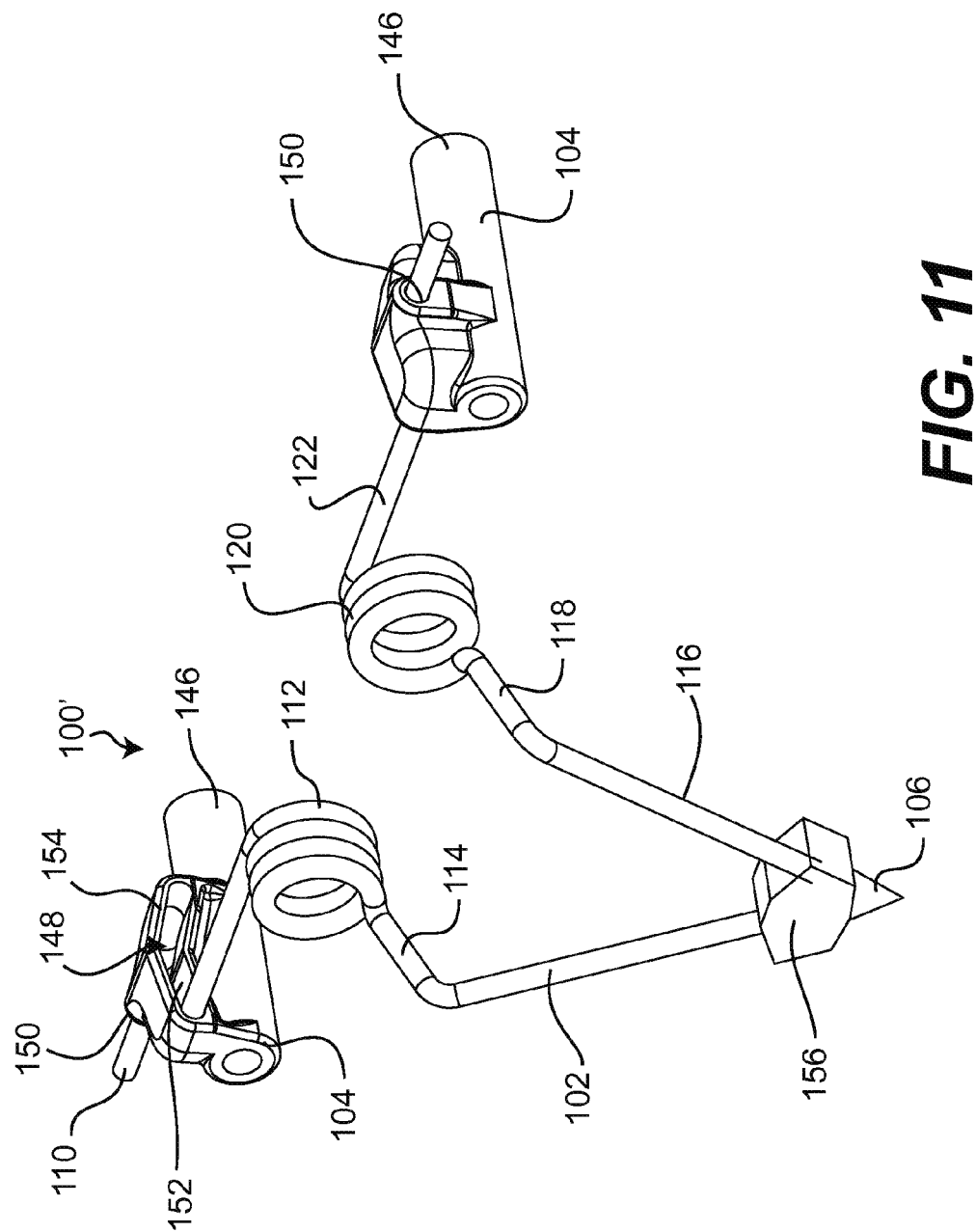
FIG. 11 is a perspective view taken from a rear, left side of an alternative embodiment of an ice scratcher, with the ice scratcher shown in an operative position.
Figure 12:
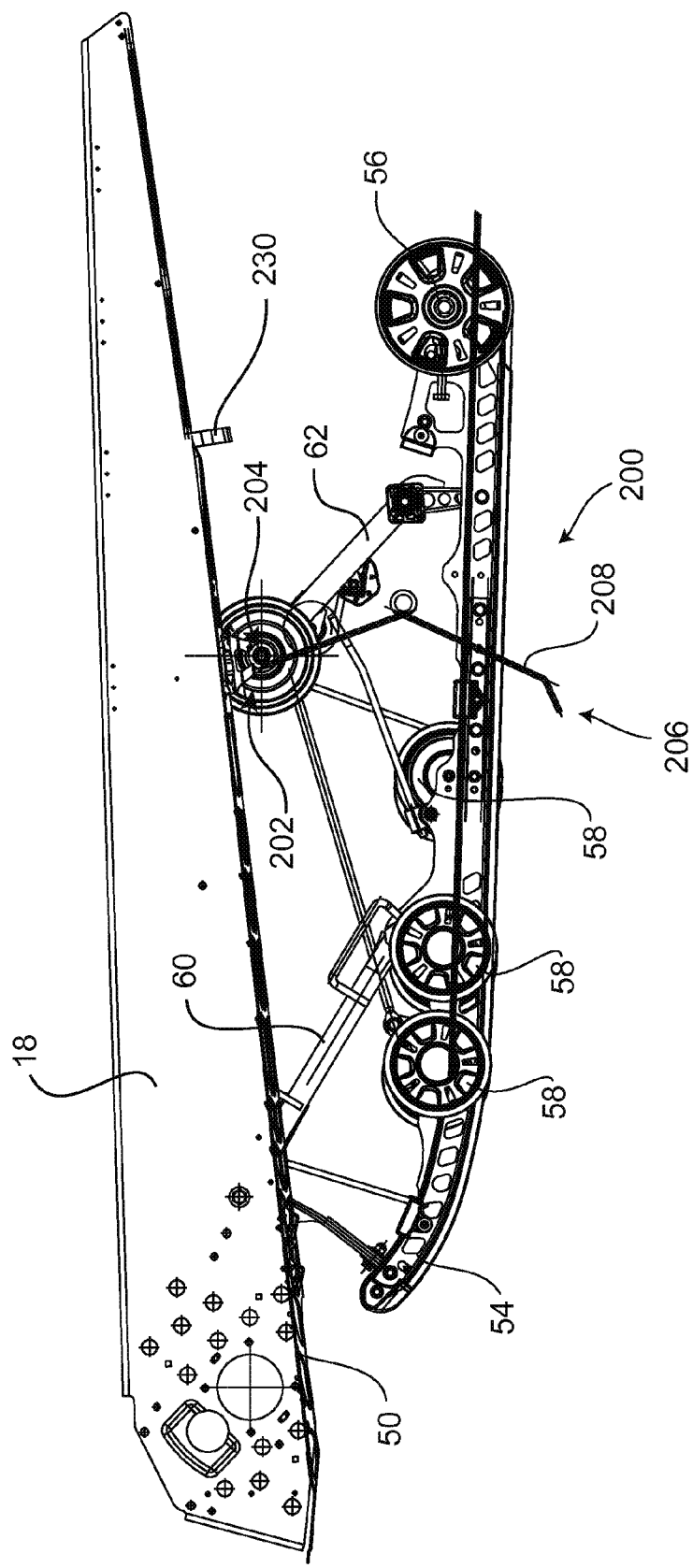
FIG. 12 is a left side elevation view of a tunnel and suspension assembly of the snowmobile of FIG. 1 with another alternative embodiment of a left ice scratcher mounted thereon in an operative position.

FIG. 11 illustrates a left ice scratcher 100' which is an alternative embodiment of the ice scratcher 100. Elements of the ice scratcher 100' that are similar to those of the ice scratcher 100 described above have been labelled with the same reference numerals. In the ice scratcher 100', the deflector 108 has been omitted. Nonetheless, the amount of ice or snow may be sufficient by properly positioning the scratching member 106 relative to the track 38. The ice scratcher 106 is connected to the apex of the V-shaped member 116 by a connector 156 receiving the apex of the V-shaped member therein. The remainder of the ice scratcher 100' is similar to the ice scratcher 100 described above, and will therefore not be described herein.

Turning now to FIGS. 12 to 15, another alternative embodiment of an ice scratcher, ice scratcher 200, will be described. FIGS. 12 to 15 show a left ice scratcher 200 connected to a bracket 202 that is connected to a bottom of the left footrest 50 of the snowmobile 10. A right ice scratcher 200 is similarly connected to the right side of the snowmobile 10. It is contemplated that the ice scratcher 200 could be connected to other portions of the tunnel 18, to the suspension assembly 42 or elsewhere on the snowmobile 10. Since the right ice scratcher 200 is a mirror image of the left ice scratcher 200, it will not be described herein. It should be noted that in FIG. 12, the ice scratcher 200 is shown as it would appear when uncompressed, such as when the snowmobile 10 is at rest on very soft snow, or with the track 38 lifted above the ground. When the snowmobile 10 operates on ice or hard packed snow, the ice scratcher 200 is compressed, the lower end of the ice scratcher 200 is closer to the slide rail 54 than shown, and when the snowmobile 10 moves forward the lower end of the ice scratcher 200 trails behind the upper end of the ice scratcher 200.

The ice scratcher 200 has an upper ice scratcher end 204 and a lower ice scratcher end 206 and consists of a bent metal rod 208. The bent rod 208 forms a coil spring 210 at the upper ice scratcher end 204. The coil spring 210 has a spring axis 212. The bent rod 208 also forms a short member 214 extending laterally inwardly (relative to the snowmobile 10) from the coil spring 210. A fastener (not shown) disposed inside the coil spring 210 fastens the ice scratcher 200 to the bracket 202. The short member 214 is received in an opening in the bracket 202, thus preventing the ice scratcher 200 from freely pivoting about the spring axis 212. The ice scratcher 200 can be pivoted about the spring axis 212, but the bias in the coil spring 210 must first be overcome. It is contemplated that the coil spring 210 could be disposed lower below the upper ice scratcher end 204.

Figure 13:
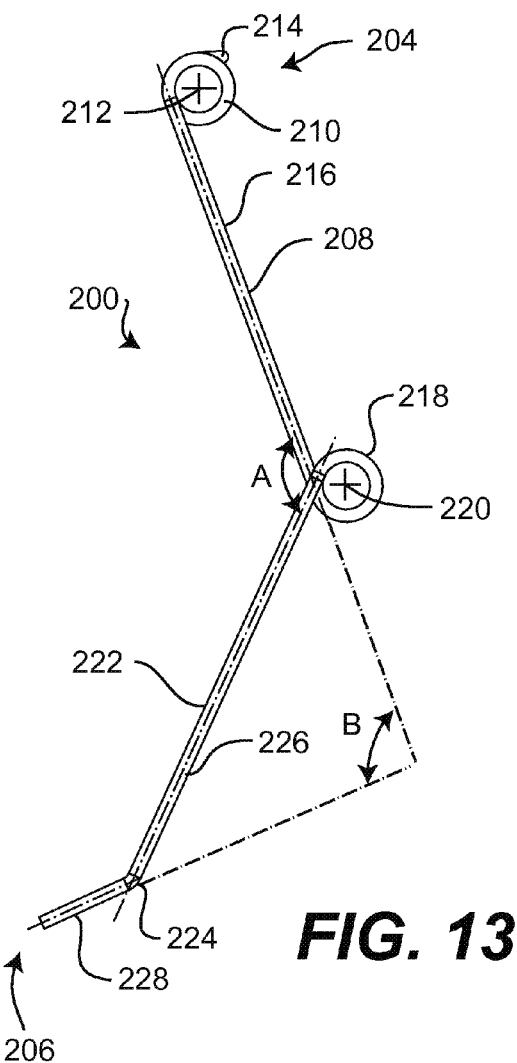
FIG. 13 is a left side elevation view of the ice scratcher of FIG. 12.

From the coil spring 210, the bent rod 208 extends rearwardly and downwardly, thereby forming an elongated member 216. From the lower end of the elongated member 216, the bent rod 208 forms a coil spring 218 having a spring axis 220. As can be seen in FIG. 13, the spring axis 220 is disposed rearwardly and downwardly from the spring axis 212. The spring axes 212 and 220 are generally parallel to each other. The coil springs 210, 218 are wound in the same direction. From the coil spring 218, the bent rod 208 extends forwardly and downwardly, thereby forming an elongated member 222. As can be seen in FIG. 13, the elongated members 216 and 222 form a V-shape. In the present embodiment, the lower end of the elongated member 222 corresponds to the lower ice scratcher end 206 of the ice scratcher 200 and is disposed forwardly of the spring axis 212. As such, the lower end of the elongated member 222 acts like the scratching member 106 described above in that it scratches the surface (ice or snow) on which the snowmobile 10 operates to generate a spray of ice or snow used to cool and lubricate as described above with respect to the ice scratcher 100. It is contemplated that a deflector, similar to the deflector 108 described above, could be connected in proximity to the lower end of the elongated member 222. It is also contemplated that a separate scratching member could be connected to the lower end of the elongated member 222. It is contemplated that such a scratching member could be replaced when worn.

As best seen in FIG. 13, the elongated member 222 is bent at a bend point 224. A portion 226 of the elongated member 222 disposed between the coil 218 and the bend point 224 is disposed at an angle A relative to the elongated member 216 when the coil springs 210 and 218 are unstressed as shown in FIG. 13. A portion 228 of the elongated member 222 disposed between the bend point 224 and the lower end of the elongated member 222 is disposed at an angle B relative to the elongated member 216 when the coil springs 210 and 218 are unstressed as shown in FIG. 13. As can be seen the angle A is greater than the angle B. It is contemplated that the elongated member 222 could not be bent.

Figure 14:
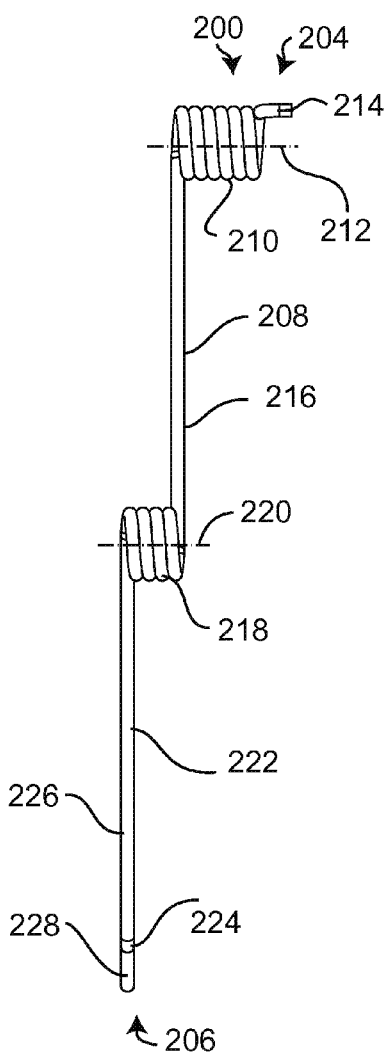
FIG. 14 is a rear elevation view of the ice scratcher of FIG. 13.
Figure 15:
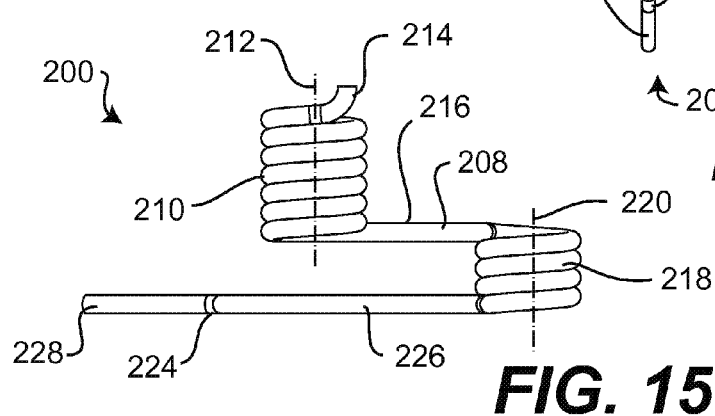
FIG. 15 is a top plan view of the ice scratcher of FIG. 13.

As can be seen in FIGS. 14 and 15, in a direction parallel to the axes 212 and 220, the elongated member 216 is disposed between the coil springs 210 and 218, and the coil spring 218 is disposed between the elongated members 216 and 222.

It should be understood that the order in which the various portions formed by the bent rod 208 has been used for ease of explanation and does not necessarily correspond to the order in which the bent rod 208 is bent to form these portions. For example, it is contemplated that the rod 208 could be bent at the bend point 224 first, followed by the coil spring 218, the coil spring 210 and finally the short member 214. It is contemplated that one, more, or all of the various portions formed by the bent rod 208 above could be separate elements that are then connected to the other elements by welding for example. In other words, the various portions formed by the rod 208 above do not have to be all integrally formed as described.

The ice scratcher 200 can be moved to a stowed position where the lower ice scratcher end 206 is spaced from the surface on which the snowmobile 10 operates. To move the ice scratcher 200 to the stowed position to the stowed position, the ice scratcher 200 is pivoted about the spring axis 212 toward the rear end 14 of the snowmobile 10 (counter-clockwise in FIG. 12) until the elongated member 222 is disposed over a horizontal portion of a bracket 230 mounted to the footrest 50 rearwardly of the bracket 202. The ice scratcher 200 is then released and the bias of the spring 210 pushes the elongated member 222 against the bracket 230, thereby maintaining the ice scratcher 200 is the stowed position. To move the ice scratcher 200 back to the operative position, the elongated member 222 is moved over the horizontal portion of the bracket 230, and the ice scratcher 200 is pivoted back down. It is contemplated that the bracket 230 could be disposed forwardly of the bracket 202, in which case the ice scratcher 200 would be pivoted in directions opposite to the ones described above to move it between its operative and stowed positions. It is contemplated that to avoid having to overcome the bias of the spring 210 to place the ice scratcher in the stowed position, the that short member 214 could first be removed from its aperture in the bracket 202, thus allowing the ice scratcher 200 to be pivoted freely about the spring axis 212.

When the snowmobile 10 is in operation with the ice scratcher 200 in its operative position, the coil springs 210, 218 bias the lower ice scratcher end 206 against the surface (ice or snow) on which the snowmobile 10 operates with enough force to scratch the surface and generate a spray of ice or snow. The coil springs 210, 218 also absorb shocks applied to the lower ice scratcher end 206 caused by uneven terrain or obstacles, such as rocks, that the lower ice scratcher end 206 can encounter, and this regardless of the direction in which the snowmobile 10 is moving. Although both coil springs 210, 218 help absorb the shocks regardless of the direction is which the snowmobile 10 operates, the coil spring 210 is the one mainly responsible for absorbing the shocks when the snowmobile 10 is moving forward and coil spring 218 is the one mainly responsible for absorbing the shocks when the snowmobile 10 is moving backward. The coil springs 210, 218 also allow for some lateral movement of the lower ice scratcher end 206 (i.e. left and right in FIG. 14).

Figure 16:
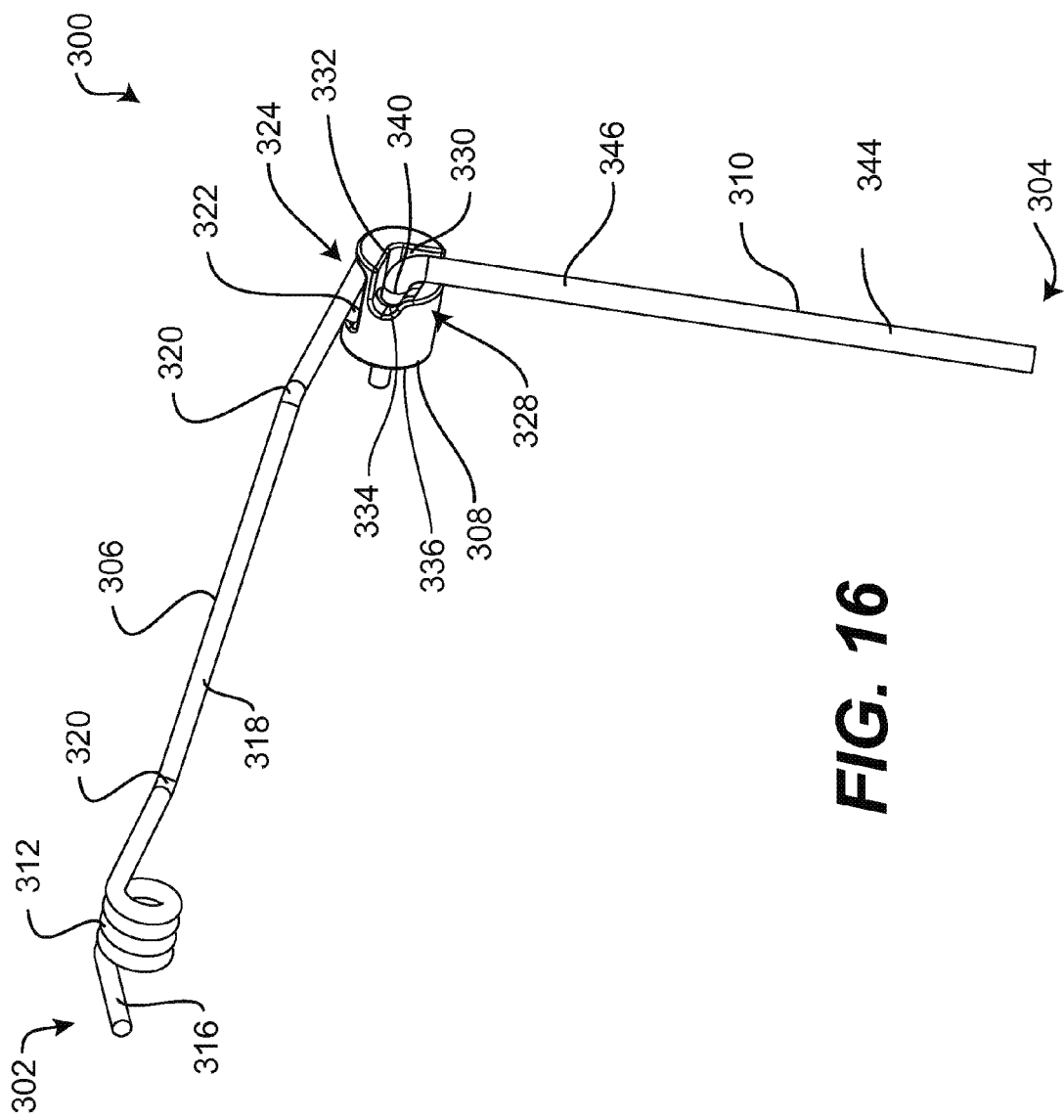
FIG. 16 is a perspective view taken from a front, left side of another embodiment of a left ice scratcher.
Figure 17:
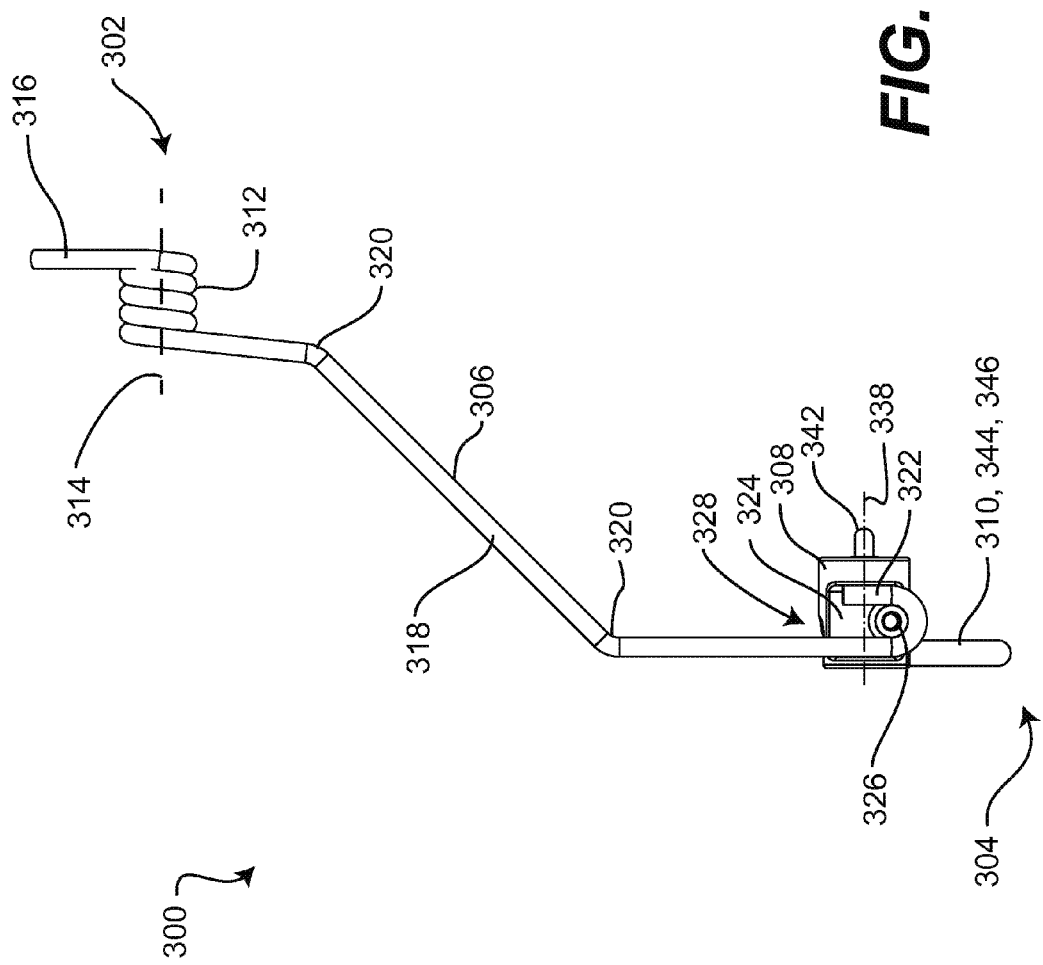
FIG. 17 is a top, rear, perspective view of the ice scratcher of FIG. 16.
Figure 18:
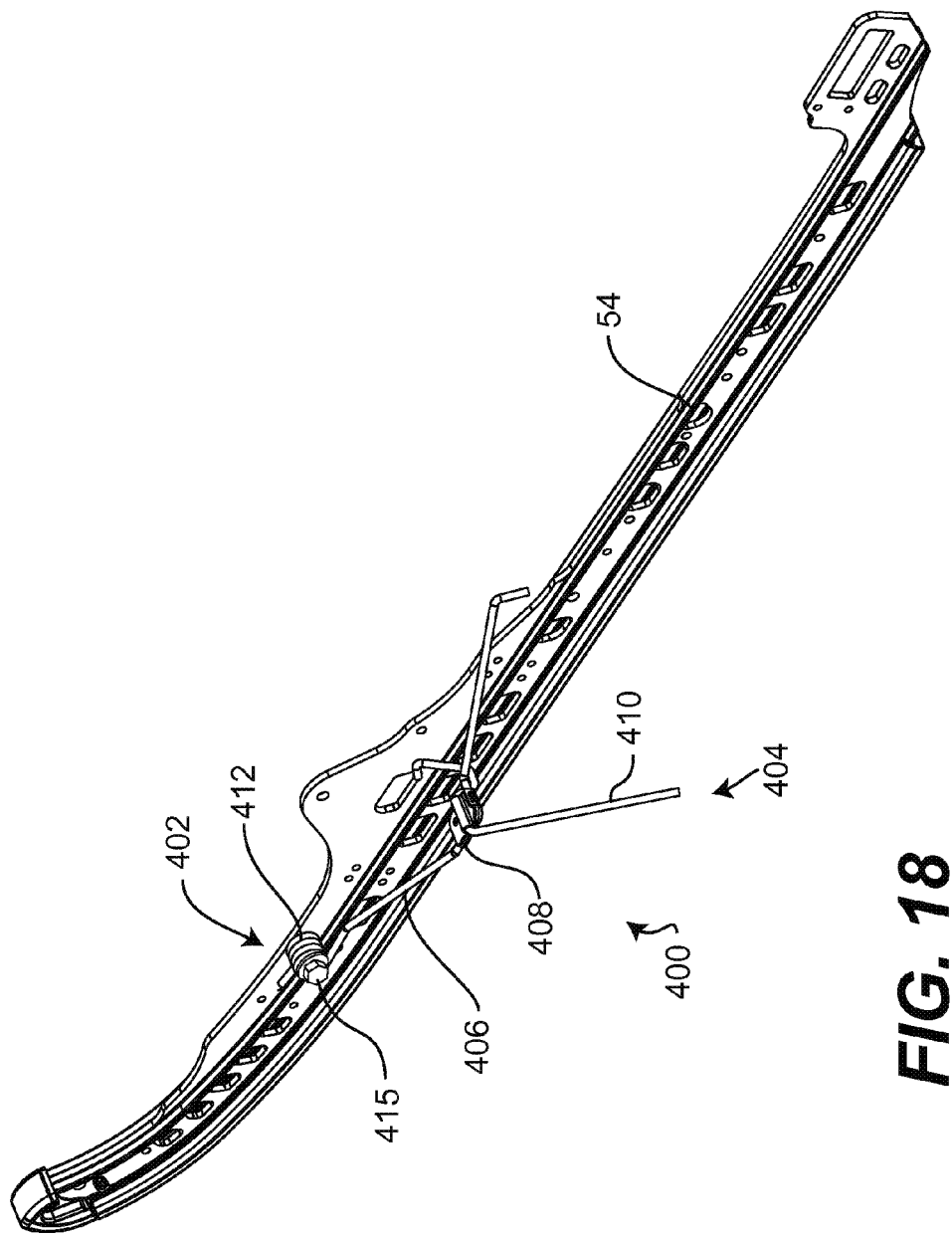
FIG. 18 is a perspective view, taken from a rear, left side, of the left side rail of the snowmobile of FIG. 1 with another alternative embodiment of a left ice scratcher mounted thereon in an operative position.

Turning now to FIGS. 16 and 17, another alternative embodiment of an ice scratcher, ice scratcher 300, will be described. FIGS. 16 and 17 show a left ice scratcher 300. The ice scratcher 300 is to be connected to a bracket (not shown) that is connected to a bottom of the left footrest 50 of the snowmobile 10 in a manner similar to the way the ice scratcher 200 is connected to the bracket 202 described above. A right ice scratcher 300 is similarly connected to the right side of the snowmobile 10. It is contemplated that the ice scratcher 300 could be connected to other portions of the tunnel 18, or could be connected to the suspension assembly 42. Since the right ice scratcher 300 is a mirror image of the left ice scratcher 300, it will not be described herein.

The ice scratcher 300 has an upper ice scratcher end 302 and a lower ice scratcher end 304 and consists of a bent metal rod 306, a connector 308, and a bent metal rod 310. The bent rod 306 forms a coil spring 312 at the upper ice scratcher end 302. The coil spring 312 has a spring axis 314 (FIG. 17). The bent rod 306 also forms a short member 316 extending longitudinally forwardly (relative to the snowmobile 10) from the coil spring 312. A fastener (not shown) disposed inside the coil spring 312 fastens the ice scratcher 300 to its bracket on the snowmobile 10. The short member 316 is received between tabs (not shown) in the bracket, thus preventing the ice scratcher 300 from freely pivoting about the spring axis 314. The ice scratcher 300 can be pivoted about the spring axis 314, but the bias in the coil spring 312 must first be overcome. It is contemplated that the coil spring 312 could be disposed lower below the upper ice scratcher end 302.

From the coil spring 312, the bent rod 306 extends rearwardly and downwardly, thereby forming an elongated member 318. As best seen in FIG. 17, the elongated member 318 is bent at two points 320 so as to extend laterally outwardly (relative to the snowmobile 10) from the coil spring 312 to its lower end 322 (FIG. 17), thereby spacing the lower ice scratcher end 304 laterally outwardly from the track 38 when the ice scratcher 300 is in an operative position. As best seen in FIG. 17, the lower end 322 of the elongated member 318 is bent to form a generally U-shape.

It is contemplated that one, some or all of the coil spring 312, the short member 316, the elongated member 318 and segments of the elongated member 318 could be formed separately from the bent rod 306 and could be connected, by welding for example, to the other elements. In other words, the various portions formed by the rod 306 above do not have to be all integrally formed as described.

The connector 308 is generally cylindrical. The connector 308 forms a recess 324 having cylindrical member 326 extending therefrom. The cylindrical member 326 is internally threaded. The lower end 322 of the elongated member 318 is received in the recess 324 such that the U-shaped portion is wrapped around the cylindrical member 326 as shown in FIG. 7. A threaded fastener (not shown) is inserted in the cylindrical member 326 to connect the connector 308 to the elongated member 318 by retaining the lower end 322 between the head of the fastener and the surface of the recess 324. It is contemplated that the connector 308 could be connected to the elongated member 308 in other ways. For example, the elongated member 318 and the connector 308 could be welded to each other. The connector 308 forms another recess 328 opposite the recess 324. The recess 328 has two surfaces that act as stoppers 330, 332 for the bent rod 310 as will be described below. An aperture 334 extends from the recess to a laterally inward side 336 (relative to the snowmobile 10) of the connector 308. An axis of the aperture 334 defines a pivot axis 338 (FIG. 17) of the bent rod 310 as will be described below. The spring axis 314 and the pivot axis 338 are generally parallel to each other and the spring axis 314 is disposed forwardly of the pivot axis 338.

The bent rod 310 is bent in a generally L-shape. A leg 340 of the bent rod 310 is inserted in the aperture 334 such that the bent rod 310 can pivot about the pivot axis 338 relative to the bent rod 306. The stopper 330 limits downward movement of the bent rod 306 (i.e. counter-clockwise rotation thereof as seen from the left side). The stopper 332 limits the upward movement of the bent rod 306 (i.e. clockwise rotation thereof as seen from the left side). An end 342 of the leg 340 (FIG. 17) of the leg 340 that extends from the laterally inward side 336 of the connector 308 is bent so as to prevent the bent rod 310 from sliding out of the aperture 334. It is contemplated that the bent rod 310 could be prevented from sliding out of the aperture 334 in other ways. For example, a washer could be welded to the end 342. A leg 344 of the bent rod 310 extends forwardly and downwardly from the connector 308 when the leg 344 abuts the stopper 330, thereby forming an elongated member 346. As can be seen, when the leg 344 abuts the stopper 330, the elongated member 318 and 346 form a V-shape. It should be understood that although the stoppers 330, 332 prevent the elongated member 346 from pivoting past a certain point, that it is contemplated that the elongated member 346 could be bent slightly past these positions by applying a force on the end of the elongated member. In the present embodiment, the lower end of the elongated member 346 corresponds to the lower ice scratcher end 304 of the ice scratcher 300 and is disposed forwardly of the spring axis 314. As such, the lower end of the elongated member 346 acts like the scratching member 106 described above in that it scratches the surface (ice or snow) on which the snowmobile 10 operates to generate a spray of ice or snow used to cool and lubricate as described above with respect to the ice scratcher 100. It is contemplated that a deflector, similar to the deflector 108 described above, could be connected in proximity to the lower end of the elongated member 346. It is also contemplated that a separate scratching member could be connected to the lower end of the elongated member 346. It is contemplated that such a scratching member could be replaced when worn. It is also contemplated that the elongated member 346 could be bent like the elongated member 222 described above. It is contemplated that the legs 340 and 344 could be separate parts connected to each other by welding for example.

As can be seen in FIG. 17, in a direction parallel to the axes 314 and 338, a portion of the elongated member 318 is disposed between the coil spring 312 and the connector 308.

The ice scratcher 300 can be moved to a stowed position where the lower ice scratcher end 304 is spaced from the surface on which the snowmobile 10 operates in a manner similar to the one described above with respect to the ice scratcher 200. It is also contemplated that the ice scratcher 300 could be moved to a stowed position by pivoting the elongated member 346 upwardly, until it reaches the stopper 332 for example, and by attaching the two elongated member 318, 346 together.

When the snowmobile 10 is in moving forward with the ice scratcher 300 in its operative position, the coil spring 312 biases the lower ice scratcher end 304 against the surface (ice or snow) on which the snowmobile 10 operates with enough force to scratch the surface and generate a spray of ice or snow. The stopper 330 prevents the elongated member 346 from pivoting away from the elongated member 318 (i.e. counter-clockwise as seen from the left side). The coil spring 312 also absorb shocks applied to the lower ice scratcher end 304 caused by uneven terrain or obstacles, such as rocks, that the lower ice scratcher end 304 can encounter as the snowmobile 10 moves forward. The coil spring 312 also allows for some lateral movement of the lower ice scratcher end 304 (i.e. left and right in FIG. 17). When the snowmobile 10 moves backward, the elongated member 346 pivots about the pivot axis 338 such that the lower ice scratcher end 304 skips over the surface on which the snowmobile 10 operates, thus preventing the ice scratcher 300 from breaking when the snowmobile 10 moves backward.

Turning now to FIGS. 18 to 25, another alternative embodiment of an ice scratcher, ice scratcher 400, will be described. FIGS. 18 to 25 show a left ice scratcher 400 connected to the left slide rail 54. A right ice scratcher 400 is similarly connected to the right slide rail 54. Since the right ice scratcher 400 is a mirror image of the left ice scratcher 400, it will not be described herein. It should be noted that in FIG. 18, the ice scratcher 400 is shown as it would appear when uncompressed, such as when the snowmobile 10 is at rest on very soft snow, or with the track 38 lifted above the ground. When the snowmobile 10 operates on ice or hard packed snow, the ice scratcher 400 is compressed, the lower end of the ice scratcher 400 is closer to the slide rail 54 than shown.

Figure 20:
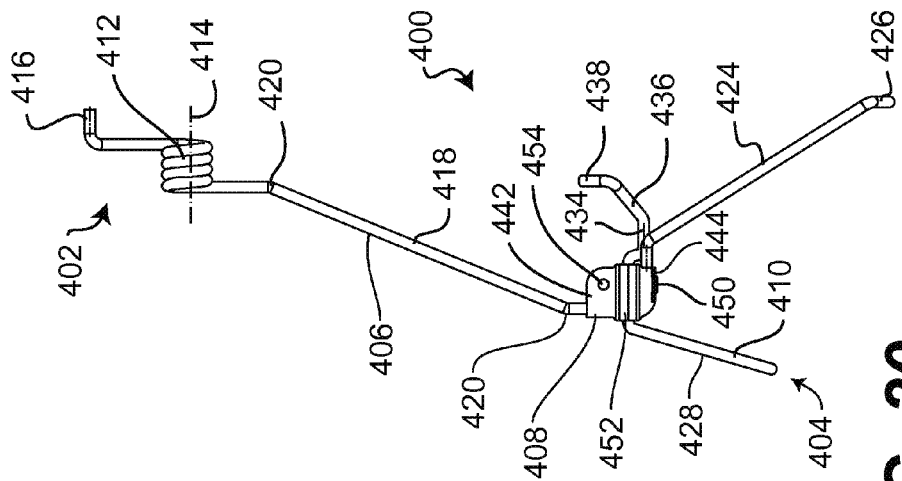
FIG. 20 is a top plan view of the ice scratcher of FIG. 19.

The ice scratcher 400 has an upper ice scratcher end 402 and a lower ice scratcher end 404 and consists of a bent metal rod 406, a connector 408, and a bent metal rod 410. The bent rod 406 forms a coil spring 412 at the upper ice scratcher end 402. The coil spring 412 has a spring axis 414 (FIG. 20). The bent rod 406 also forms a short member 416 disposed forwardly and extending laterally inwardly (relative to the snowmobile 10) of the coil spring 412. A fastener 415 disposed inside the coil spring 412 fastens the ice scratcher 400 to the slide rail 54. In the present embodiment, the fastener 415 includes a bolt, a nut and a washer. The short member 416 is received in an opening in the slide rail 54, thus preventing the ice scratcher 400 from freely pivoting about the spring axis 414. The ice scratcher 400 can be pivoted about the spring axis 414, but the bias in the coil spring 412 must first be overcome. It is contemplated that the coil spring 412 could be disposed lower below the upper ice scratcher end 402.

From the coil spring 412, the bent rod 406 extends rearwardly and downwardly, thereby forming an elongated member 418. As best seen in FIG. 20, the elongated member 418 is bent at two points 420 so as to extend laterally outwardly (relative to the snowmobile 10) from the coil spring 412, thereby spacing the lower ice scratcher end 404 laterally outwardly from the track 38 when the ice scratcher 400 is in an operative position. As best seen in FIG. 22, from the elongated member 418, the bent rod 406 is bent to form a generally L-shaped member 422. From the L-shaped member 422, the bent rod 406 extends rearwardly and laterally inwardly (relative to the snowmobile 10), thereby forming an elongated member 424. From the elongated member 424, the bent rod 406 forms a downwardly extending member 426.

The members 424, 426 limit downward movement of the ice scratcher 400 by abutting the slide rail 54. This could occur when the snowmobile 10 moves over soft snow for example.

It is contemplated that one, some or all of the coil spring 412, the short member 416, the elongated member 418, the L-shaped member 422, the elongated member 424, the downwardly extending member 426 and segments thereof could be formed separately from the bent rod 406 and could be connected, by welding for example, to the other elements. In other words, the various portions formed by the rod 406 above do not have to be all integrally formed as described.

The bent rod 410 has a portion bent into a generally L-shape, thus forming a leg 428 and a leg 430 (FIG. 22). As can be seen in FIG. 20, the leg 428 extends laterally outwardly (relative to the snowmobile 10). From the laterally inward end of the leg 430, the bent rod 410 is bent to form a member 432 extending downwardly and inwardly, then a member 434 extending laterally inwardly, then a member 436 extending laterally inwardly and upwardly, and finally a member 438 extending forwardly and downwardly (relative to the snowmobile 10 and with respect to the position of the bent rod 410 shown in FIG. 19).

It is contemplated that one, some or all of the legs 428, 430, the members 432, 434, 436, 438 and segments thereof could be formed separately from the bent rod 410 and could be connected, by welding for example, to the other elements. In other words, the various portions formed by the rod 410 above do not have to be all integrally formed as described.

The connector 408 includes a connector body 440, a cover 442, and a fastener (not shown). The connector body 440 has an upwardly extending tab 444 having a slot. The connector body 440 also has an L-shaped channel 446 (FIG. 22) to receive the L-shaped member 422 of the bent rod 406. An aperture 448 (FIG. 22) is also defined in the connector body 440. The cover 442 has a tab 450. The cover 442 also has a channel 452 adapted to receive the leg 430 of the bent rod 410. An aperture 454 is also defined in the cover 442 and is located so as to be aligned with the aperture 448 in the connector body 440 when the ice scratcher 400 is assembled.

Figure 19:
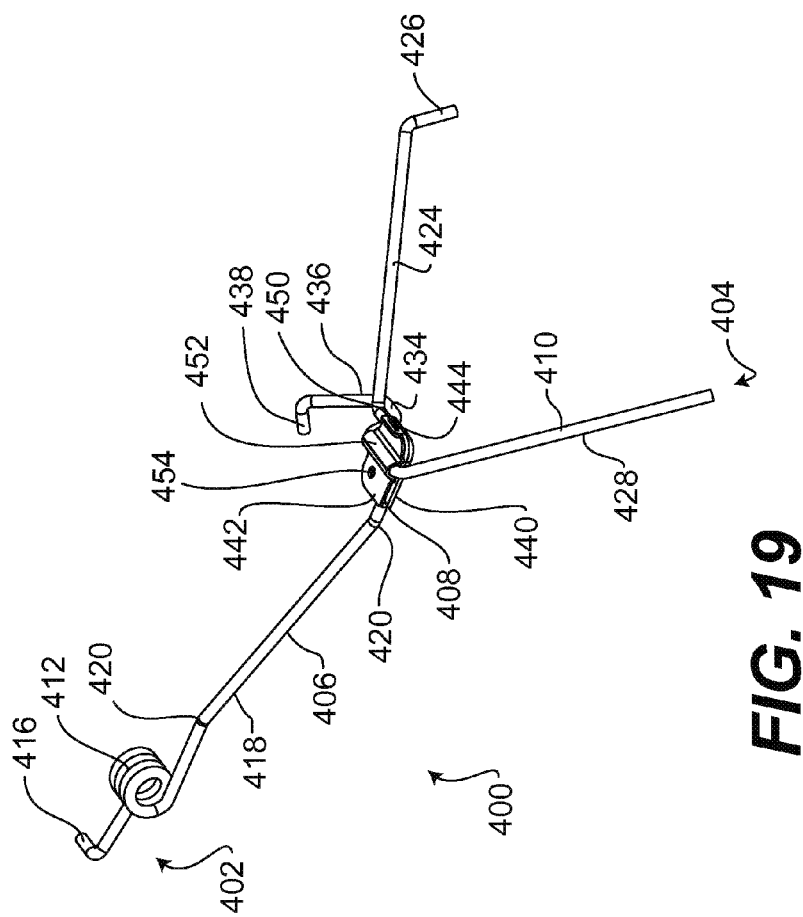
FIG. 19 is a perspective view, taken from a rear, left side, of the ice scratcher of FIG. 18.

To assemble the ice scratcher 400, the L-shaped member 422 of the bent rod 406 is disposed in the L-shaped channel 446 of the connector body 440. The bent rod 410 is then disposed over the connector body 440 such that the leg 428 and the member 432 are disposed on either side of the connector body 440 and the leg 430 is disposed over the L-shaped member 422 and the connector body 440 as shown in FIG. 19. The tab 450 of the cover 442 is then inserted in the slot of the tab 444 of the connector body 440. The cover 442 is then lowered against the connector body 440 such that the leg 430 of the bent rod 410 is received in the channel 452 and the apertures 448 and 454 are aligned. Finally, the fastener is inserted in the apertures 448, 454, thus preventing the cover 442 and the connector body 440 from being separated. The bent rod 410 can pivot inside the channel 452 about a pivot axis 456 (FIG. 22) defined by the leg 430. The leg 428 and the member 432 limit the lateral motion of the bent rod 410 inside the channel 452. The pivot axis 456 of the bent rod 410 is generally parallel to the spring axis 414.

In the present embodiment, the lower end of the leg 428 corresponds to the lower ice scratcher end 404 of the ice scratcher 400. In the operative position of the ice scratcher shown in FIGS. 18 to 20, the lower ice scratcher end 404 is disposed rearwardly of the spring axis 414 and of the pivot axis 456. As such, the lower end of the leg 428 acts like the scratching member 106 described above in that it scratches the surface (ice or snow) on which the snowmobile 10 operates to generate a spray of ice or snow used to cool and lubricate as described above with respect to the ice scratcher 100. It is contemplated that a deflector, similar to the deflector 108 described above, could be connected in proximity to the lower end of the leg 428. It is also contemplated that a separate scratching member could be connected to the lower end of the leg 428. It is contemplated that such a scratching member could be replaced when worn.

Figure 23:
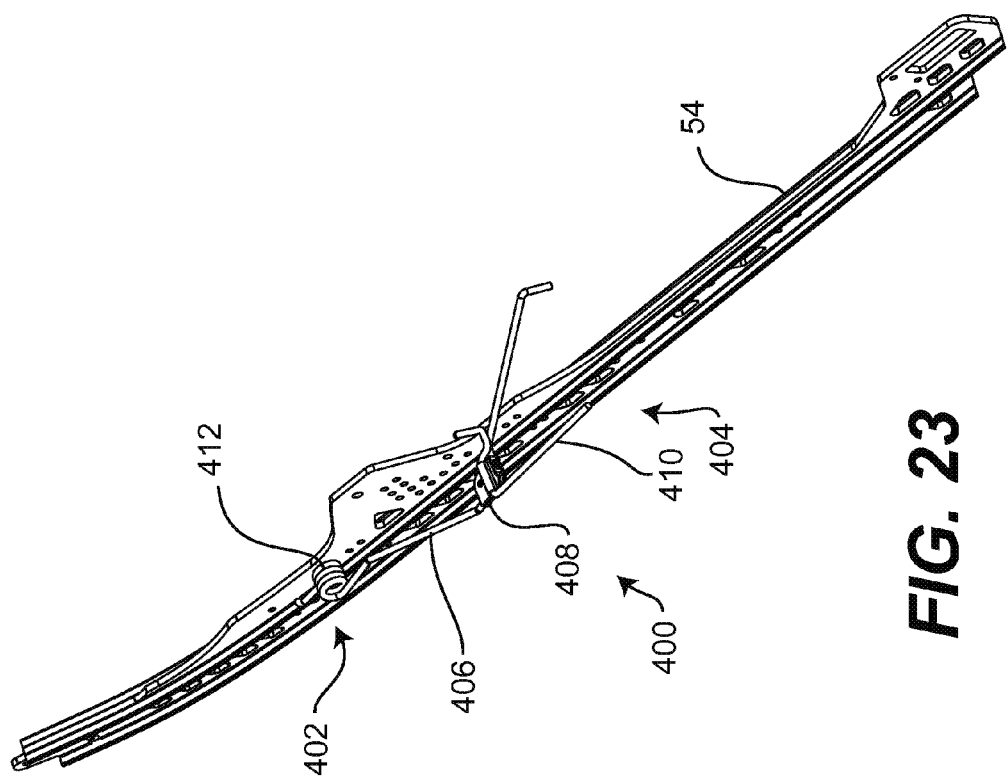
FIG. 23 is a perspective view, taken from a rear, left side, of the left side rail of the snowmobile of FIG. 1 with the left ice scratcher of FIG. 19 mounted thereon in a stowed position.

The ice scratcher 400 can be moved to a stowed position, shown in FIGS. 23 to 25, where the lower ice scratcher end 404 is spaced from the surface on which the snowmobile 10 operates. To do so, the bent rod 406 is first lifted, overcoming the bias of the spring 412, to space the end of the leg 428 of the bent rod 410 from the surface on which the snowmobile 10 stands. The bent rod 410 is then rotated clockwise (as viewed from a left side of the snowmobile such as in FIG. 1) about the pivot axis 456 until it is in the position shown in FIGS. 23 to 25. In this position, the member 434 of the bent rod 410 rests on top of the member 424 of the bent rod 406. As such, the bent rod 410 is prevented from pivoting down. The bent rod 406 is then pulled laterally inwardly, thus causing some deformation of the spring 412 and member 418, in order to hook the member 438 of the bent rod 410 over the slide rail 54 as shown in FIG. 23. This reduces the amount by which the ice scratcher 400 laterally sticks out. This also prevents the bent rod 410 from pivoting counter-clockwise (as viewed from a left side of the snowmobile such as in FIG. 1), which could otherwise happen should the snowmobile 10 hit a bump or obstacle during operation for example. To move the ice scratcher 400 back to its operative position, the above steps are repeated in the reverse order.

When the snowmobile 10 is moving forward with the ice scratcher 400 in its operative position, the coil spring 412 biases the lower ice scratcher end 404 against the surface (ice or snow) on which the snowmobile 10 operates with enough force to scratch the surface and generate a spray of ice or snow. The underside of the L-shaped member 422 and member 424 of the bent rod 406 act as a stopper to limit counter-clockwise pivoting (as viewed from a left side of the snowmobile such as in FIG. 1) of the leg 428 of the bent rod 410. When the leg 428 pivots counter-clockwise from its position shown in FIGS. 18 to 20, the member 434 of the bent rod 410 eventually abuts the underside of the L-shaped member 422 and member 424 of the bent rod 406, thus limiting further counter-clockwise rotation. The coil spring 412 also absorb shocks applied to the lower ice scratcher end 404 caused by uneven terrain or obstacles, such as rocks, that the lower ice scratcher end 404 can encounter as the snowmobile 10 moves forward. The coil spring 412 also allows for some lateral movement of the lower ice scratcher end 404 (i.e. left and right in FIG. 20). When the snowmobile 10 moves backward, the bent rod 410 pivots about the pivot axis 456 such that the lower ice scratcher end 404 is disposed forward of the pivot axis 456 and skips over the surface on which the snowmobile 10 operates, thus preventing the ice scratcher 400 from breaking when the snowmobile 10 moves backward. When the snowmobile 10 starts moving forward again, the bent rod 410 pivots about the pivot axis 456 such that the ice scratcher 400 returns to its operative position.

Modifications and improvements to the above-described embodiments of the present may become apparent to those skilled in the art. The foregoing description is intended to be exemplary rather than limiting. The scope of the present is therefore intended to be limited solely by the scope of the appended claims.

What is claimed is:

1. An ice scratcher for attachment to a snowmobile comprising:
   a first ice scratcher end;
   a second ice scratcher end opposite the first ice scratcher end;
   a first coil spring having a first spring axis disposed at or near the first ice scratcher end;
   a first elongated member having a first end connected to the first coil spring;
   a second coil spring connected to a second end of the first elongated member, the second coil spring having a second spring axis, the second spring axis being offset from the first spring axis; and
   a second elongated member having a first end connected to the second coil spring and a second end at or near the second ice scratcher end.

2. The ice scratcher of claim 1, wherein the first and second elongated members form a V-shape.

3. The ice scratcher of claim 1, wherein, in a direction parallel to the first spring axis, the first elongated member is disposed between the first and second coil springs, and the second coil spring is disposed between the first and second elongated members.

4. The ice scratcher of claim 1, wherein the first and second spring axes are generally parallel to each other.

5. The ice scratcher of claim 1, wherein, when the ice scratcher is attached in an operative position to a snowmobile at rest, the second end of the second elongated member is disposed forwardly of the first spring axis, and the first spring axis is disposed forwardly of the second spring axis.

6. The ice scratcher of claim 1, wherein, when the ice scratcher is attached in an operative position to a snowmobile at rest, the first elongated member extends downwardly and rearwardly from the first coil spring to the second coil spring and the second elongated member extends downwardly and forwardly from the second coil spring toward the second ice scratcher end.

7. The ice scratcher of claim 1, wherein the second elongated member is bent at a bend point, the second elongated member having a first portion between the first end of the second elongated member and the bend point and a second portion between the bend point and the second end of the second elongated member;
   wherein, when the first and second springs are unstressed, a first angle between the first portion and the first elongated member is greater than a second angle between the second portion and the first elongated member.

8. The ice scratcher of claim 1, wherein the first elongated member, the second elongated member, the first coil spring and the second coil spring are integrally formed.

9. A snowmobile comprising:
   a frame including a tunnel;
   at least one ski operatively connected to the frame;
   a seat disposed on the tunnel;

an engine connected to the frame;

an endless track disposed at least in part under the tunnel and operatively connected to the engine;

a suspension assembly operatively connected to the track; and at least one ice scratcher according to claim 1 operatively connected to one of the frame and the suspension assembly, the at least one ice scratcher having an operative position where the second ice scratcher end of the at least one ice scratcher is in contact with a surface on which the snowmobile operates at a position laterally outward of the endless track.

10. The snowmobile of claim 9, further comprising at least one bracket connected to the tunnel;

wherein the first ice scratcher end of the at least one ice scratcher is connected to the at least one bracket.

11. The snowmobile of claim 9, wherein the at least one ice scratcher is selectively movable to a stowed position where the second ice scratcher end of the at least one ice scratcher is spaced from the surface on which the snowmobile operates.

12. The snowmobile of claim 9, wherein the at least one ice scratcher includes a left ice scratcher operatively connected to a left side of the one of the frame and the suspension assembly and a right ice scratcher operatively connected to a right side of the one of the frame and the suspension assembly.

* * * * *